(12) United States Patent
Duggal et al.

(10) Patent No.: US 10,678,518 B2
(45) Date of Patent: *Jun. 9, 2020

(54) DECLARATIVE SOFTWARE APPLICATION META-MODEL AND SYSTEM FOR SELF MODIFICATION

(71) Applicant: EnterpriseWeb LLC, Glens Falls, NY (US)

(72) Inventors: Dave M. Duggal, Glens Falls, NY (US); William J. Malyk, Guelph (CA)

(73) Assignee: ENTERPRISEWEB LLC, Glen Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,012

(22) Filed: Jan. 8, 2019

(65) Prior Publication Data
US 2019/0146760 A1    May 16, 2019

Related U.S. Application Data

(63) Continuation of application No. 15/281,564, filed on Sep. 30, 2016, now Pat. No. 10,175,956, which is a continuation of application No. 14/791,820, filed on Jul. 6, 2015, now Pat. No. 9,483,238, which is a continuation of application No. 13/846,630, filed on Mar. 18, 2013, now Pat. No. 9,075,616.

(60) Provisional application No. 61/612,907, filed on Mar. 19, 2012.

(51) Int. Cl.
*G06F 9/44* (2018.01)
*G06F 8/35* (2018.01)
*G06F 8/10* (2018.01)
*G06F 8/20* (2018.01)

(52) U.S. Cl.
CPC .................. *G06F 8/35* (2013.01); *G06F 8/10* (2013.01); *G06F 8/20* (2013.01)

(58) Field of Classification Search
CPC .................. G06F 8/35; G06F 8/10; G06F 8/20
USPC .......................................................... 717/111
See application file for complete search history.

(56) References Cited

U.S. PATENT DOCUMENTS

| 5,469,533 A | 11/1995 | Dennis |
| 6,249,291 B1 | 6/2001 | Popp et al. |
| 6,268,852 B1 | 7/2001 | Lindhorst et al. |

(Continued)

OTHER PUBLICATIONS

Title: Cognitive control of real-time event-driven systems, author: Y Anzai, published on 1984.*

(Continued)

*Primary Examiner* — Chameli Das
(74) *Attorney, Agent, or Firm* — Sheppard, Mullin, Richter & Hampton LLP

(57) ABSTRACT

A solution providing for the dynamic design, use, and modification of models using a declarative software application meta-model that provides for self-modification of a collection of the models is provided. The solution can enable continuous real-time testing, simulation, deployment, and modification of the collection of the models. A model in the collection of the models can represent an entity or a function and can be included in a set of related models. Additionally, a set of related models can include a plurality of sets of related models. The collection of the models can represent, for example, one or more software applications, processes, and/or the like.

20 Claims, 17 Drawing Sheets

(56) References Cited

U.S. PATENT DOCUMENTS

| | | | |
|---|---|---|---|
| 6,862,732 B1 | 3/2005 | Schultz et al. | |
| 7,089,316 B2 | 8/2006 | Andersen et al. | |
| 7,095,715 B2 | 8/2006 | Buckman et al. | |
| 7,310,684 B2 | 12/2007 | Patrick et al. | |
| 7,444,620 B2 | 10/2008 | Marvin | |
| 7,506,302 B2 | 3/2009 | Bahrami | |
| 7,542,956 B2 | 6/2009 | Strassner et al. | |
| 7,546,295 B2 | 6/2009 | Brave et al. | |
| 7,565,613 B2 | 7/2009 | Forney | |
| 7,574,663 B2 | 8/2009 | Popp et al. | |
| 7,580,930 B2 | 8/2009 | Brave et al. | |
| 7,613,713 B2 | 11/2009 | Forney | |
| 7,633,868 B2 | 12/2009 | Buckman et al. | |
| 7,644,007 B2 | 1/2010 | Elazouni | |
| 7,652,594 B2 | 1/2010 | Lamont et al. | |
| 7,652,680 B2 | 1/2010 | Popp et al. | |
| 7,653,008 B2 | 1/2010 | Patrick et al. | |
| 7,653,638 B2 | 1/2010 | Forney | |
| 7,885,847 B2 * | 2/2011 | Wodtke | G06Q 10/10 705/7.26 |
| 8,392,877 B1 | 3/2013 | Chiluvuri | |
| 8,423,954 B2 | 4/2013 | Ronen et al. | |
| 8,694,958 B1 | 4/2014 | Potter et al. | |
| 9,075,616 B2 | 7/2015 | Duggal et al. | |
| 9,323,504 B1 | 4/2016 | Kinast et al. | |
| 2002/0055849 A1 | 5/2002 | Georgakopoulos et al. | |
| 2002/0138659 A1 | 9/2002 | Trabaris et al. | |
| 2002/0198765 A1 | 12/2002 | Magrino et al. | |
| 2003/0012147 A1 | 1/2003 | Buckman et al. | |
| 2003/0037181 A1 | 2/2003 | Freed | |
| 2003/0061266 A1 | 3/2003 | Ouchi et al. | |
| 2003/0154191 A1 * | 8/2003 | Fish | G06F 8/34 |
| 2003/0236877 A1 | 12/2003 | Allan | |
| 2004/0015821 A1 | 1/2004 | Lu et al. | |
| 2004/0078777 A1 | 4/2004 | Bahrami | |
| 2004/0098311 A1 | 5/2004 | Nair et al. | |
| 2004/0172618 A1 | 9/2004 | Marvin | |
| 2004/0225995 A1 | 11/2004 | Marvin et al. | |
| 2005/0027585 A1 | 2/2005 | Wodtke et al. | |
| 2005/0264581 A1 | 12/2005 | Patrick et al. | |
| 2005/0267892 A1 | 12/2005 | Patrick et al. | |
| 2005/0267947 A1 | 12/2005 | Patrick et al. | |
| 2005/0270970 A1 | 12/2005 | Patrick et al. | |
| 2005/0273497 A1 | 12/2005 | Patrick et al. | |
| 2005/0273502 A1 | 12/2005 | Patrick et al. | |
| 2005/0273516 A1 | 12/2005 | Patrick et al. | |
| 2005/0273517 A1 | 12/2005 | Patrick et al. | |
| 2005/0273518 A1 | 12/2005 | Patrick et al. | |
| 2005/0273520 A1 | 12/2005 | Patrick et al. | |
| 2005/0273521 A1 | 12/2005 | Patrick et al. | |
| 2005/0273759 A1 | 12/2005 | Lucassen et al. | |
| 2005/0273847 A1 | 12/2005 | Patrick et al. | |
| 2005/0278335 A1 | 12/2005 | Patrick et al. | |
| 2005/0278374 A1 | 12/2005 | Patrick et al. | |
| 2006/0005063 A1 | 1/2006 | Patrick et al. | |
| 2006/0007918 A1 | 1/2006 | Patrick et al. | |
| 2006/0031353 A1 | 2/2006 | Patrick et al. | |
| 2006/0031354 A1 | 2/2006 | Patrick et al. | |
| 2006/0031355 A1 | 2/2006 | Patrick et al. | |
| 2006/0031431 A1 | 2/2006 | Patrick et al. | |
| 2006/0031432 A1 | 2/2006 | Patrick et al. | |
| 2006/0031433 A1 | 2/2006 | Patrick et al. | |
| 2006/0031481 A1 | 2/2006 | Patrick et al. | |
| 2006/0031930 A1 | 2/2006 | Patrick et al. | |
| 2006/0034237 A1 | 2/2006 | Patrick et al. | |
| 2006/0053272 A1 | 3/2006 | Roth et al. | |
| 2006/0069791 A1 | 3/2006 | Patrick et al. | |
| 2006/0080419 A1 | 4/2006 | Patrick et al. | |
| 2006/0136555 A1 | 6/2006 | Patrick et al. | |
| 2006/0212593 A1 | 9/2006 | Patrick et al. | |
| 2006/0239273 A1 | 10/2006 | Buckman et al. | |
| 2007/0069855 A1 | 3/2007 | Boland et al. | |
| 2007/0069896 A1 | 3/2007 | Boland et al. | |
| 2007/0074169 A1 | 3/2007 | Chess et al. | |
| 2007/0094672 A1 | 4/2007 | Hayton et al. | |
| 2007/0157138 A1 | 7/2007 | Ciolfi et al. | |
| 2007/0168907 A1 | 7/2007 | Iborra et al. | |
| 2007/0198240 A1 * | 8/2007 | Moriat | G06F 30/331 703/17 |
| 2007/0250812 A1 | 10/2007 | Sanghvi et al. | |
| 2008/0005732 A1 | 1/2008 | Coon | |
| 2008/0034367 A1 | 2/2008 | Patrick et al. | |
| 2008/0072235 A1 | 3/2008 | Rodgers et al. | |
| 2008/0077932 A1 | 3/2008 | Ruppach et al. | |
| 2008/0092068 A1 | 4/2008 | Norring et al. | |
| 2008/0155104 A1 | 6/2008 | Quinn et al. | |
| 2008/0158605 A1 | 7/2008 | Engbrocks et al. | |
| 2008/0186852 A1 | 8/2008 | Sami et al. | |
| 2008/0212963 A1 | 9/2008 | Fortin et al. | |
| 2008/0225706 A1 | 9/2008 | Lange | |
| 2008/0239167 A1 | 10/2008 | Goldberg | |
| 2008/0244319 A1 | 10/2008 | Nehab et al. | |
| 2008/0263206 A1 | 10/2008 | Bivens et al. | |
| 2008/0300844 A1 | 12/2008 | Bagchi et al. | |
| 2008/0306751 A1 | 12/2008 | Conroy et al. | |
| 2008/0319757 A1 | 12/2008 | Da Palma et al. | |
| 2009/0024432 A1 | 1/2009 | Bauters et al. | |
| 2009/0086752 A1 | 4/2009 | Anderson et al. | |
| 2009/0113156 A1 | 4/2009 | Fujita et al. | |
| 2009/0113379 A1 * | 4/2009 | Sedukhin | G06F 8/10 717/104 |
| 2009/0119334 A1 | 5/2009 | Ahern et al. | |
| 2009/0164621 A1 | 6/2009 | Kothari et al. | |
| 2009/0165021 A1 | 6/2009 | Pinkston et al. | |
| 2009/0241088 A1 | 9/2009 | Dangeville et al. | |
| 2009/0300578 A1 | 12/2009 | Neil | |
| 2009/0319937 A1 | 12/2009 | Molander et al. | |
| 2009/0323550 A1 | 12/2009 | Buckman et al. | |
| 2010/0010960 A1 | 1/2010 | Singh | |
| 2010/0011013 A1 | 1/2010 | Singh | |
| 2010/0179951 A1 | 7/2010 | McPhail | |
| 2010/0199260 A1 * | 8/2010 | Duggal | G06F 8/20 717/106 |
| 2011/0072340 A1 | 3/2011 | Miller et al. | |
| 2011/0178830 A1 | 7/2011 | Knowles | |
| 2012/0185821 A1 | 7/2012 | Yaseen et al. | |
| 2012/0198417 A1 * | 8/2012 | Haviv | G06F 8/75 717/105 |
| 2012/0284009 A1 * | 11/2012 | De Florio | G06F 8/10 703/22 |
| 2012/0311533 A1 | 12/2012 | Fanning et al. | |
| 2013/0080371 A1 * | 3/2013 | Harber | G06F 16/686 706/50 |
| 2013/0232245 A1 * | 9/2013 | Antosz | G06F 8/10 709/222 |
| 2014/0317315 A1 | 10/2014 | Duchesneau | |

OTHER PUBLICATIONS

Title: Metamodel-based tool integration with moflon, C Amelunxen et al, published on 2008, source ACM/IEEE.*

Title: Model-driven development of complex software: A research roadmap, author: R France et al, published on 2007.*

Adams et al., YAWL, Chapter 7 "The Architecture," Sep. 21, 2009, pp. 1-16.

Battle, R. et al., "Bridging the semantic Web and Web 2.0 with Representational State Transfer (REST)," Journal of Web Semantics, Nov. 17, 2007, vol. 6, No. 1, pp. 61-69.

Blair et al., "The Design of a Resource-Aware Reflective Middleware Architecture", P. Cointe (Ed.): Reflection '99, LNCS 1616, pp. 115-134, 1999, Copyright Springer-Verlag Berlin Heidelberg 1999.

Blair, G.S. et al., "An Architecture for Next Generation Middleware", Distributed Multimedia Research Group, Computing Department, Lancaster University, Bailrigg, Lancaster, UK, 1998, 16 pages.

BPM—Business Process Management, ActiveBPEL, ActiveVOS Comparison, "ActiveBPEL Engine / ActiveVOS Enterprise Edition Comparison" http://www.activevos.com/compare.php, Date Unknown, Printed Mar. 17, 2010, 3 pages.

BPM ActiveVOS Business Process Management Suite from Active Endpoints, "Using ActiveVOS", http://www.activevos.com/products-features.php, Date Unknown, Printed Mar. 17, 2010, 10 pages.

(56) References Cited

OTHER PUBLICATIONS

BPM Focus, "Cases Managed the World Over", http://bpmfocus.wordpress.com/2009/06/21/cases-managed-the-world-over/, Jun. 21, 2009, 6 pages.
Dubray, J. "The Seven Fallacies of Business Process Execution", Dec. 4, 2007, pp. 1-10, http://www.infoq.com/articles/seven-fallacies-of-bpm.
Duggal et al., "Putting Work in Context for Enterprise Agility," Dec. 6, 2010, 6 pages, COCOA.
Duran-Limon, H.A. et al., IEEE Distributed Systems Online 1541-4922, Copyright 2004 Published by the IEEE Computer Society, vol. 5, No. 7, Jul. 2004, pp. 1-13.
Epiphany: Replace HATEOS with "Hypermedia Describes Protocols", http://blogs.gartner.com/nick_gall/2009/06/02/epiphany-replace-hateoas-with-hypermedia-describ . . . , Jun. 2, 2009, 2 pages.
Fiammante, M., The SOA Magazine, "Dynamic SOA and BPM", Sep. 25, 2009, 11 pages, http://www.soamag.com/132/0909-2.asp.
Fielding, R.T., "REST APIs must be hypertext-driven," roy.gbiv.com/untangled/2008/rest-apis-must-be-hypertext-driven, Oct. 20, 2008 (printed Apr. 29, 2013).
Fielding, R.T., "Dissertation", University of California, Irvine, Architectural Styles and the Design of Network-based Software Architectures, 2000, Copyright Roy Thomas Fielding, 2 pages.
Grace et al., "A Reflective Framework for Fine-Grained Adaptation of Aspect-Oriented Compositions", Software Composition 2008, Budapest, Mar. 2008, 22 pages.
Henk De Man, C., "Case Management: OMG RFP released!", http://www.brsilver.com/bpmncase/?p=31, Sep. 24, 2009, 4 pages.
Khare, R. et al., "Extending the Representational State Transfer (REST) Architectural Style for Decentralized Systems," Proceedings of the 26th International Conference on Software Engineering (ICSE '04), May 23, 2004, pp. 428-437.
Papyrus Platform Architecture, "Copying is the most sincere form of flattery!", http://isispapyrus.wordpress.com/2009/10/04/copying-fattery, Oct. 4, 2009, 4 pages.
Peng, Y. et al., "A Reflective Information Model for Reusing Software Architecture", 2008 ISECS International Colloquium on Computing, Communication, Control, and Management, Copyright 2008 IEEE, pp. 270-275.
Rodriguez, A., IBM, XP-002578060, "RESTful Web services: The basics," Nov. 6, 2008, 12 pages.
SOA Consortium, "Business Architecture: The Missing Link between Business Strategy and Enterprise Architecture", Copyright 2010 Object Management Group, pp. 1-14.
Stepney, S. et al., "Reflecting on Open-Ended Evolution," In "Advances in Artificial Life, ECAL 2011," MIT Press, XPO55076886, ISBN: 978-0-26-229714-1, pp. 781-788.
Szepielak, D. "REST-Based Service Oriented Architecture for Dynamically Integrated Information Systems", Deutsches Elektronen-Synchrotron, Notkestrasse 85, 22607 Hamburg, Germany, 2008, pp. 7-12.
Thoughts on Collaborative Planning, "It is All Taylor's Fault", Jan. 8, 2010, http://kswenson.wordpress.com/2010/01/08/it-is-all-taylors-fault/, 11 pages.
Thoughtworks, Dr. Jim Webber, "Hateos: The Confusing Bit from REST", May 26, 2009, 45 pages.
Tosic, V. et al., "Improving Business Processes in the Australian Lending Industry", Abstract only of Seminar presented on Aug. 25, 2008, 1 page.
Van Der Aalst, W.M.P. et al., "Flexibility as a Service", Eindhoven University of Technology, Eindhoven, The Netherlands, 2008, 15 pages.
Xu, X. et al., "Resource-Oriented Architecture for Business Processes", 2008, 15th Asia-Pacific Software Engineering Conference, pp. 395-402.
Xu, X. et al., "Resource-Oriented Business Process Modeling of Ultra-Large-Scale Systems", ULSSIS '08, May 10-11, 2008, Leipzig, Germany, Copyright 2008, pp. 65-68.
Yuan, M., "JBoss Seam: A Deep Integration Framework", pp. 1-15, Jul. 1, 2007, http://www.theserverside.com/news/1364119/JBoss-Seam-A-Deep-Integration-Framework.
Zhu, L. et al., "On Creating Industry-Wide Reference Architectures", 12th International IEEE Enterprise Distributed Object Computing Conference, Sep. 15-19, 2008, pp. 24-30.
Zhu, L. et al., "Reference Architecture for Lending Industry in ULS Systems", 29th International Conference on Software Engineering Workshops, (ICSEW '07), Copyright 2007 IEEE, 3 pages.
Das, C., U.S. Appl. No. 14/791,820, Notice of Allowance, dated Aug. 10, 2016, 10 pages.
Das, C., U.S. Appl. No. 14/791,820, Office Action1, dated Jun. 10, 2016, 24 pages.
Das, C., U.S. Appl. No. 13/846,630, Notice of Allowance, dated Mar. 5, 2015, 16 pages.
Das, C., U.S. Appl. No. 13/846,630, Non-Final Office Action1, dated Nov. 6, 2014, 25 pages.
Mitchell, J., U.S. Appl. No. 12/698,361, Non-Final Office Action Communication, dated Jan. 29, 2013, 31 pages.
Mitchell, J., U.S. Appl. No. 12/698,361, Notice of Allowance, dated Jul. 24, 2013, 24 pages.
International Application No. PCT/US2013032846, International Search Report and the Written Opinion, dated Sep. 19, 2013, 9 pages.
International Application No. PCT/US2010/022849, International Search Report and the Written Opinion, dated May 4, 2010, 14 pages.

* cited by examiner

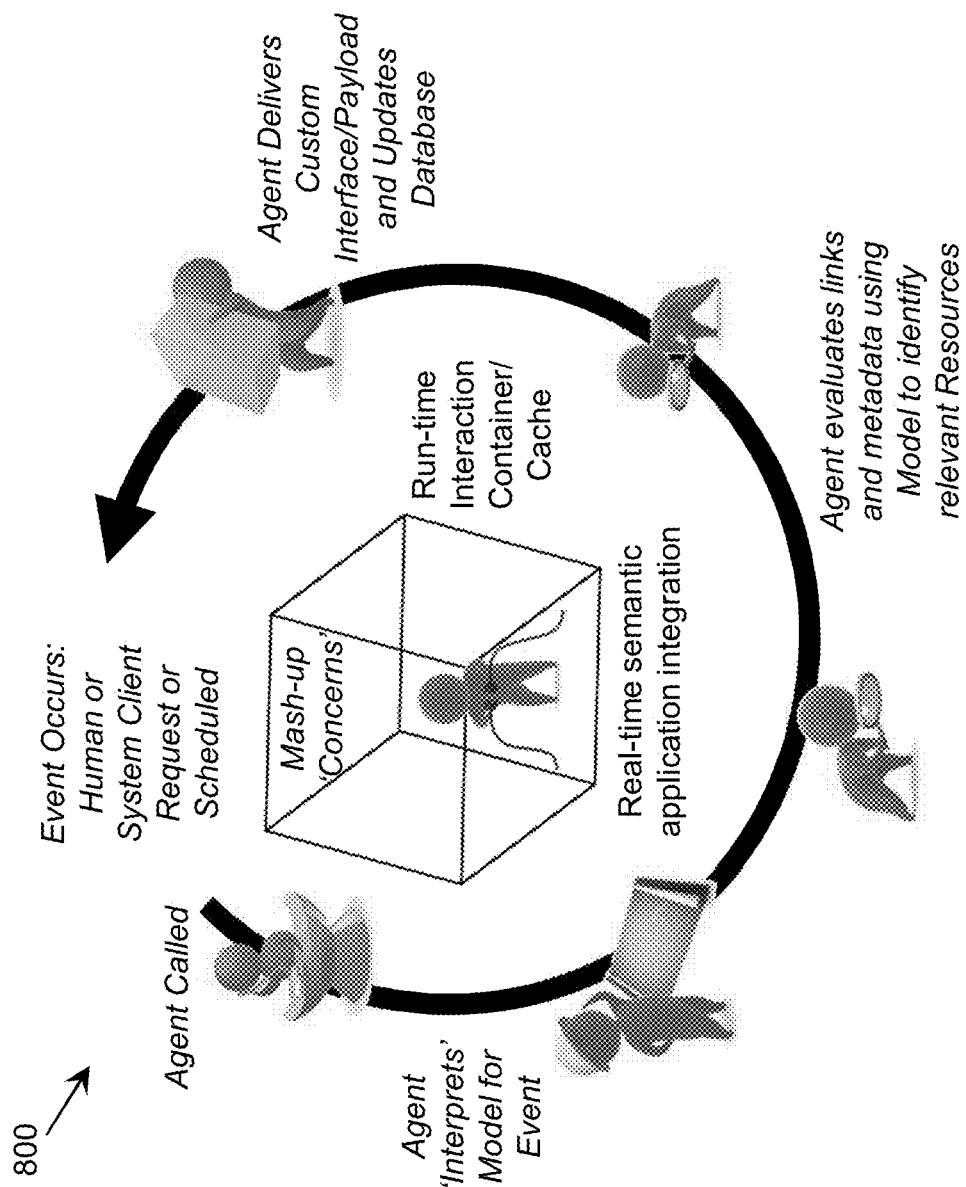

FIG. 9E

Decision Table (Analysis)

*Define Parameters and Triggers For Analysis Below*

Result Name: [SubmissionProbability]
Result Function: ▼ Sum

| ▼ Function | ▼ Scaling Factor | × |
|---|---|---|
| FO.interests.match | 0.25 | |
| × FO.interests.match | 0.25 | |
| × PI.successRate(FC | 0.50 | |

<== Add Column

Add Additional Row

DECLARATIVE SOFTWARE APPLICATION META-MODEL AND SYSTEM FOR SELF MODIFICATION

CROSS-REFERENCE TO RELATED APPLICATIONS

The current application is a continuation of U.S. patent application Ser. No. 15/281,564 filed Sep. 30, 2016 and entitled "Declarative Software Application Meta-Model and System for Self-Modification," now U.S. Pat. No. 10,175,956, which is a continuation of U.S. patent application Ser. No. 14/791,820 filed Jul. 6, 2015 and entitled "Declarative Software Application Meta-Model and System for Self-Modification," now U.S. Pat. No. 9,483,238, which is a continuation of U.S. patent application Ser. No. 13/846,630 filed Mar. 18, 2013 and entitled "Declarative Software Application Meta-Model and System for Self-Modification," now U.S. Pat. No. 9,075,616, which claims the benefit of U.S. Provisional Patent Application Ser. No. 61/612,907 filed Mar. 19, 2012 and entitled "Software Application Modeling Environment," each of which is hereby incorporated by reference herein.

TECHNICAL FIELD

The disclosure relates generally to model development and use, and more particularly, to dynamic design, use, and modification of models using a declarative software application meta-model that provides for self-modification.

BACKGROUND ART

All organizations want to be agile so they can seize opportunities, respond to threats, and generally evolve. Adaptation is a fundamental counter-entropy strategy; organisms, including human organizations that fail to adapt to their environment are not sustainable.

Adaptation as it relates to human organizations includes an ability to support local "variance," (including automated personalization for a single instance and user-driven modification for a single instance) where the variance can occur without a disruptive "exception," and global change, (including automated "machine learning") where change to the whole for all future instances can occur without disruption. However, for software developed using a conventional style, such as Object Oriented Development (OOD) and Service Oriented Architecture (SOA), local adaptation and global adaptation commonly result in disruptive exceptions, as both styles are generally procedural in nature and deliver fixed implementations of models. In these styles the models and their implementation are generally 'hidden' behind static interfaces, methods and/or the like, so the models are not modifiable directly by people utilizing the models or by software agents working on their behalf. While a model, or its interface, methods and/or the like, may allow for a range of conditions, those conditions are not subject to variation and change directly by the users interacting with them—they are other fixed attributes of the model. This approach limits dynamic local variance and global change, creating a discontinuity where use and modeling are divided into a "run-time" and "design-time" respectively.

This is the normative convention of software application modeling. It is a paradigm that was established when everything was standardized, change was infrequent and any change was always centrally controlled. In our time of rapid and decentralized change, this paradigm has become a rate-limiter for enterprise agility, organization-wide structural impedance that makes variance and change 'expensive' if not, in many cases, impractical for technical reasons alone. This approach limits the general utility of such models and they become increasingly less useful overtime (entropy), such that 'exceptions' and change management are major logistical challenges for modern businesses that limit their operational responsiveness. It results in: delays and frustration; shadow systems, which compound change management problems; and lost business value. Given the centrality and importance of information systems to most organizations, the ability for related models to support adaptability (non-disruptive variance and change) is conceptually fundamental to business agility.

The act of modeling defines an 'object' for a purpose. In the context of a human organization and Enterprise information systems, models include data models (entities and entity relationship diagrams), process models (flowcharts), service interfaces, business objects, and/or the like. A model definition provides facts regarding an object's attributes, including relationships to other objects. The definitions, attributes and relationships of models are generally subject to change, the only variable being the frequency of change. When model definitions are encoded and deployed in a static fashion they structurally constrain interaction to the design-time context of the central 'modeler' and/or designer or the like without consideration of the context of subsequent use of the model (premature optimization), thereby ensuring exceptions to the model, which must be handled, if at all, in a discontinuous fashion. Each implementation is an execution of the 'as is' model. The approach promotes standardization at the cost of variance and change.

The conventional software application model, as represented by Object Oriented Development (OOD) and Service Oriented Architecture (SOA), is to design static models of business entities, business objects, services, and processes. To form business applications, the models are integrated, generally in a tightly-coupled manner, which leads to dependencies. As part of a greater system of interaction between models, the problems of adaptation are compounded as change to an application consuming multiple models might also require change to multiple models to achieve the intended change to the application's properties. In addition, in the course of modifying an application, any change to one model of the set of models may negatively impact (e.g., 'break' or 'crash) instances of the application, the application as a whole, and might even cause problems for the greater system on which the application runs. The more complex the application, the higher number of dependencies, the harder it becomes to support variance and change.

In the meantime, the world is becoming increasingly distributed, the rate of change is accelerating, and business requirements are becoming more complex, all of which exacerbate problems with the conventional software application model.

The inventors previously described a solution for increasing context-based customization of interaction deliverables in U.S. patent application Ser. No. 12/698,361, filed on 2 Feb. 2010, published as US Patent Publication No. 2010/0199260, which is hereby incorporated by reference. An embodiment of the solution provides a software application, which includes work order resources, each of which defines an atomic operation for the software application, and a construction service resource, which processes the work order resources in response to all interaction requests for the software application. Each interaction request is received from a client and identifies a corresponding work order, which the construction service processes to dynamically construct a set of deliverables, which can include a custom representation of the work order. While processing the interaction request, the construction service, as directed by the work order, can make one or more requests to context resources for context information corresponding to an activity for which the interaction was requested to construct the set of deliverables. The work order resource can comprise a reflective program that enables the construction service to dynamically determine and construct the set of deliverables, including the next appropriate interaction(s), using the context information, thereby directing a set of atomic operations as part of an activity being performed and enabling the dynamic context-based construction of interaction deliverables.

SUMMARY OF THE INVENTION

Aspects of the invention provide a solution providing for the dynamic design, use, and modification of models using a declarative software application meta-model that provides for self-modification of a collection of the models. The solution can enable continuous real-time testing, simulation, deployment, and modification of the collection of the models. A model in the collection of the models can represent an entity or a function and can be included in a set of related models. Additionally, a set of related models can include a plurality of sets of related models. The collection of the models can represent, for example, one or more software applications, processes, and/or the like. An embodiment of the solution described herein can execute on a system of the inventors' prior solution.

A first aspect of the invention provides a system comprising: a computer system including at least one computing device, wherein the computer system provides dynamic design, use, and modification of models using a declarative application meta-model that provides for self-modification of a collection of the models.

A second aspect of the invention provides a system comprising: a computer system including at least one computing device, wherein the computer system provides dynamic design, use, and modification of models using a declarative application meta-model that provides for self-modification of a collection of the models, wherein the providing enables continuous real-time testing, simulation, deployment, and modification of the collection of the models, wherein a model of the collection of the models represents at least one of: a discrete entity or a function, wherein the collection of the models include at least one set of related models, and wherein each model in a set of related models can configure at least one of a set of properties of the set of related models so that collective properties of the set of related models emerge dynamically from interaction of the set of related models.

A third aspect of the invention provides a system comprising: a computer system including at least one computing device, wherein the computer system provides dynamic design, use, and modification of models using a declarative application meta-model that provides for self-modification of at least one of: a software application or a process represented by a collection of the models, wherein the collection of the models includes at least one set of related models, and wherein each model in a set of related models can configure at least one of a set of properties of the set of related models so that collective properties of the set of related models emerge dynamically from interaction of the set of related models during execution of an instance of the set of related models.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 8 shows an illustrative processing cycle of an event according to an embodiment.

FIGS. 9A-9I show illustrative graphical user interfaces according to embodiments.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
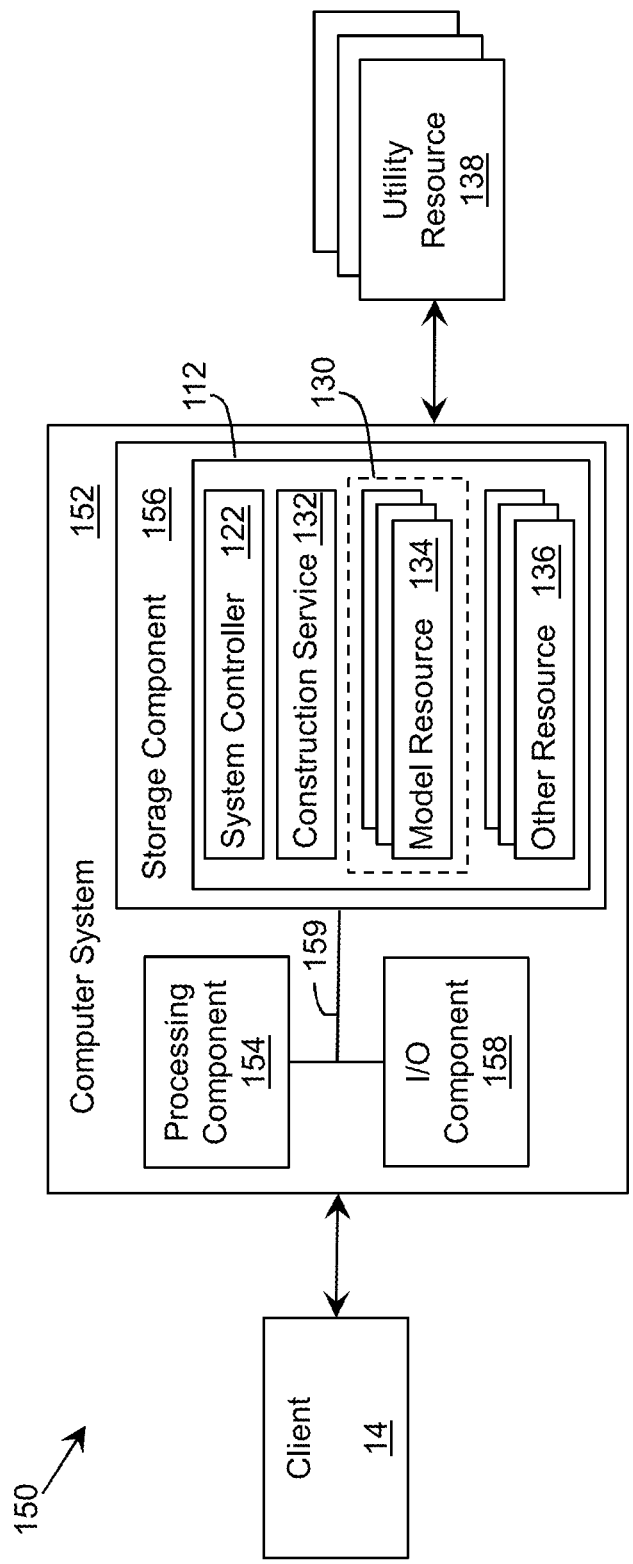
FIG. 1 shows an illustrative environment for dynamic management of models using a declarative application meta-model that provides for self-modification according to an embodiment.

As used herein, unless otherwise noted, the term "set" means one or more (i.e., at least one) and the phrase "any solution" means any now known or later developed solution.

The inventors recognize that the conventional software application model does not support the desired business agility. The inventors propose that structure, including the structure of a software application or an Enterprise IT systems infrastructure, should flexibly support a range of structures fit for business purposes, as well as support overall change. By conflating a model with its implementation, the conventional software application model creates accidental complexity resulting in impedance within the enterprise information system infrastructure. The act of solution development is generally not supportive of application lifecycle management post solution delivery, thereby addressing a short-term business problem while creating a long-running problem for the business as it relates to evolving the application for future requirements.

Furthermore, the inventors recognize one or more problems with the current distinction between development ("design-time") and end user ("runtime") environments in the software development lifecycle. Frequently, an application change cannot be fully tested in the development environment without fully replicating the runtime environment, which may not be possible or may be prohibitively expensive. As a result, many issues introduced when an application is changed remain undetected until the application is executing in the runtime environment. These issues grow significantly with the complexity of the system, making many of these systems more prone to having issues. Additionally, an ability for an end user to customize application behavior is limited to changing those settings predefined by the software developer during design time for that part of an application. Such an ability is not a generalized capability of the application or the greater system in which the application interacts.

The inventors propose a solution, in which the benefits of the model can be obtained, while providing flexibility in implementation and allowing change to the model. The model can be separated from (e.g., only loosely coupled to) its implementation so local variance of an instance of a model (including user-driven modification and automated "personalization") and/or global change to a model (including user-driven modification and automated "machine learning") are enabled. Furthermore, the solution can provide an ability to readily create new versions of a model, while preserving history, so that the model can be updated seamlessly to accommodate change. The solution can willfully constrain personalization, variance and change to restrict who, what, or when those properties are available. However, such a constraint is not a structural inhibition of the solution, rather those rules themselves can be subject to the same properties and are capable of being modified in response to changes in requirements.

To this extent, the solution can model in a declarative manner that preserves loose-coupling of stateless immutable models, handled as representations (as in a REST-style architecture) of a model and execute in a fashion (e.g., late-binding) that enables use and interactions with models while preserving their loosely-coupled and stateless nature. The declarative modeling, loose-coupling, immutability, statelessness, and late-binding of an embodiment of the solution allows for the separation of models from their implementation (e.g., representations of models bind at run-time), enabling local variance and global change in a continuous non-disruptive fashion that supports business agility, while supporting restrictions of a type that are not structural constraints, and while providing audit history and rollback capabilities to allow for variance and change to be transparent and manageable.

In an embodiment, the inventors propose a software application development model that does not require a distinction between development of the application and use of the application in an environment. Furthermore, the software application can be used to modify itself. While development of such a software application can be done in a separate development environment, the proposed software application development model does not make a distinction between design and runtime. The inventors propose that such a distinction in the conventional software application model is an unnatural, unnecessary abstraction. The physical separation of the design and runtime activities creates a discontinuity, a divide between development and use of the application, which creates challenges with both software development and change management (collectively the application development lifecycle) independent of the actual business problems that the application is intended to resolve. The inventors recognize that this divide can be sufficiently significant that the conventional IT/development approaches themselves work against business agility by creating rigid disconnected structures that are hard to govern, manage, and adapt as a whole system.

A software application created as described herein can be fully dynamic—with the developer and the end user both getting the same benefits from a single unified environment. In an embodiment, the application is built in a manner in which the developer does not need to build/compile any of the application components that define the model(s) of the application, which can enable real-time simulation and deployment of the changed application (e.g., the changes can take effect immediately). Without a compile/build requirement, application testing can be made easier, thereby enabling refactoring or changing to be vastly accelerated because there does not need to be any separation of runtime and design time (e.g., there does not need to be discontinuous activities performed in separate environments).

In an embodiment, the application is defined by stateless loosely coupled immutable resources (e.g., a set of models) using a declarative model-driven application development environment. In this case, an update to the application can simply require modification of related resources at which point the update can take effect immediately, without requiring any development intervention. All users, both those developing and those utilizing the models, can benefit from new operational responsiveness. In addition, since everything can be dynamic, development activity 'rights' can be delegated to any user who may then modify the application at will based on permissions and any required approval processes as directed by resources (e.g., one or more models in the set of models) of the application. The declarative model-driven application development environment can enable design, configuration, modification and extension of a real time software application (collectively "development activities"), wherein the late-binding of the real-time software application can enable all users to potentially perform development activities using the declarative model-driven application development environment, or components thereof, without disrupting the environment or the application itself.

As indicated above, aspects of the invention provide a solution providing for the dynamic design, use, and modification of models using a declarative software application meta-model that provides for self-modification of a collection of the models. The solution can enable continuous real-time testing, simulation, deployment, and modification of the collection of the models. A model in the collection of the models can represent an entity or a function and can be included in a set of related models. Additionally, a set of related models can include a plurality of sets of related models. The collection of the models can represent, for example, one or more software applications, processes, and/or the like. An embodiment of the solution described herein can execute on a system of the inventors' prior solution.

In an embodiment, the collection of models represent a software application and there is no distinction between "design-time" and "run-time" for the software application. Instead, the software application processes all such activity in "real-time." All feedback from any user for any purpose, can be immediate in its effect, though the processing of decisions by the application can be extended through workflows for other input and approvals, but all processing by the application is still performed in real-time with each interaction. While further aspects of the invention are described using an embodiment in which a collection of models represents a software application, it is understood that the collection of models, or a set of related models included therein, can represent any type of entity and/or function. To this extent, a model in the collection of models can represent a discrete entity, a function, and/or the like. Furthermore, a set of related models in the collection of models can represent a complex entity, a complex function, and/or the like. The collection of models can include multiple sets of related models, any one of which can include one or more sets of related models. The collection of models can represent a software application, a process, and/or the like, either of which can be formed from multiple models representing various types of functions and/or entities.

Turning to the drawings, FIG. 1 shows an illustrative environment 150 for providing dynamic management (e.g., design, use, and modification) of model resources 134 using a declarative application meta-model that provides for self-modification according to an embodiment. In this case, the model resources 134 represent an application 130, which is executing in the environment 150 in order to perform an activity according to an embodiment. To this extent, the environment 150 includes a computer system 152 that can perform a process described herein in order to manage the model resources 134 representing the application 130 and other resources 136. In particular, the computer system 152 is shown including a modeling application 112, which makes the computer system 152 operable to manage the model resources 134 and other resources 136 as described herein.

The computer system 152 is shown including a processing component 154 (e.g., one or more processors), a storage component 156 (e.g., a storage hierarchy), an input/output (I/O) component 158 (e.g., one or more I/O interfaces and/or devices), and a communications pathway 159. In general, the processing component 154 executes program code, such as a system controller 122 of the modeling application 112 and/or representations of one or more resources of the application 130, which is at least partially fixed in the storage component 156. While executing program code, the processing component 154 can process data, which can result in reading and/or writing transformed data from/to the storage component 156 and/or the I/O component 158 for further processing. The pathway 159 provides a communications link between each of the components in the computer system 152. The I/O component 158 can comprise one or more human I/O devices, which enable a human client 14 to interact with the computer system 152 and/or one or more communications devices to enable a system client 14 to communicate with the computer system 152 using any type of communications link. To this extent, the computer system 152 can manage a set of interfaces (e.g., graphical user interface(s), application program interface, and/or the like) that enable human and/or system clients 14 to interact with the application 130 via the modeling application 112. Furthermore, the modeling application 112 can manage (e.g., store, retrieve, create, manipulate, organize, present, etc.) the data, such as one or more of the model resources 134 of the application 130 or other resources 136, using any data management solution.

In any event, the computer system 152 can comprise one or more general purpose computing articles of manufacture (e.g., computing devices) capable of executing program code, such as the system controller 122 of the modeling application 112, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the modeling application 112 can be embodied as any combination of system software and/or application software.

As used herein, the term "component" means any configuration of hardware, with or without software, which implements the functionality described in conjunction therewith using any solution. The term "module" means program code that enables a computer system 152 to implement the functionality described in conjunction therewith using any solution, and refers to the system controller 122 and program artifacts of the resources of the application 130. When fixed in a storage component 156 of a computer system 152 that includes a processing component 154, a module is a substantial portion of a component that implements the functionality. Regardless, it is understood that two or more components, modules, and/or systems may share some/all of their respective hardware and/or software. Furthermore, it is understood that some of the functionality discussed herein may not be implemented or additional functionality may be included as part of the computer system 152.

When the computer system 152 comprises multiple computing devices, each computing device can have only a portion of the modeling application 112 and/or the application 130 fixed thereon (e.g., one or more resources of the application 130). However, it is understood that the computer system 152 and the modeling application 112 are only representative of various possible equivalent computer systems that may perform a process described herein. To this extent, in other embodiments, the functionality provided by the computer system 152 and the modeling application 112 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 152 includes multiple computing devices, the computing devices can communicate over any type of communications link. Furthermore, while performing a process described herein, the computer system 152 can communicate with one or more other computer systems using any type of communications link. In either case, the communications link can comprise any combination of various types of wired and/or wireless links; comprise any combination of one or more types of networks; and/or utilize any combination of various types of transmission techniques and protocols. In an embodiment, the computer system 152 comprises an application server, which communicates with clients 14 over the Internet.

As discussed herein, the application 130 can be represented by model resources 134. Additionally, the computer system 152, e.g., by executing the modeling application 112, can provide dynamic design, use, and modification of the model resources 134 representing the application 130 using a declarative application meta-model that provides for self-modification. To this extent, the computer system 152 can enable continuous real-time testing, simulation, deployment, and modification of the model resources 134 representing the application 130 as described herein.

Execution of the application 130 can result in the generation of one or more other resources 136. The other resources 136 can be utilized along with the model resources 134, to enable the computer system 152 to execute a set of actions used by the application 130 to perform an activity. One or more of the resources of the application 130 can be separately developed and/or implemented remote from other portions of the application 130. For example, a set of utility resources 138 are shown implemented remote from the application 130. However, it is understood that any resources of the application 130, such as one or more of the model resources 134, also can be separately developed and/or implemented. Furthermore, it is understood that the environment 150 can include a mix of model resources 134 that are part of the application 130 and remote from the application 130.

As described herein, a model resource 134 can represent an entity, a function, and/or the like. The model resources 134 can include one or more sets of related models, each of which can represent a complex entity, a complex function, and/or the like. A set of related models can be expressed using a set of declarative relations, which can be defined using any solution, and stored as model resources 134 of the application 130 using any solution. For example, a declarative relation can be defined using a uniform resource identifier (URI), a metadata reference, and/or the like.

Figure 2:
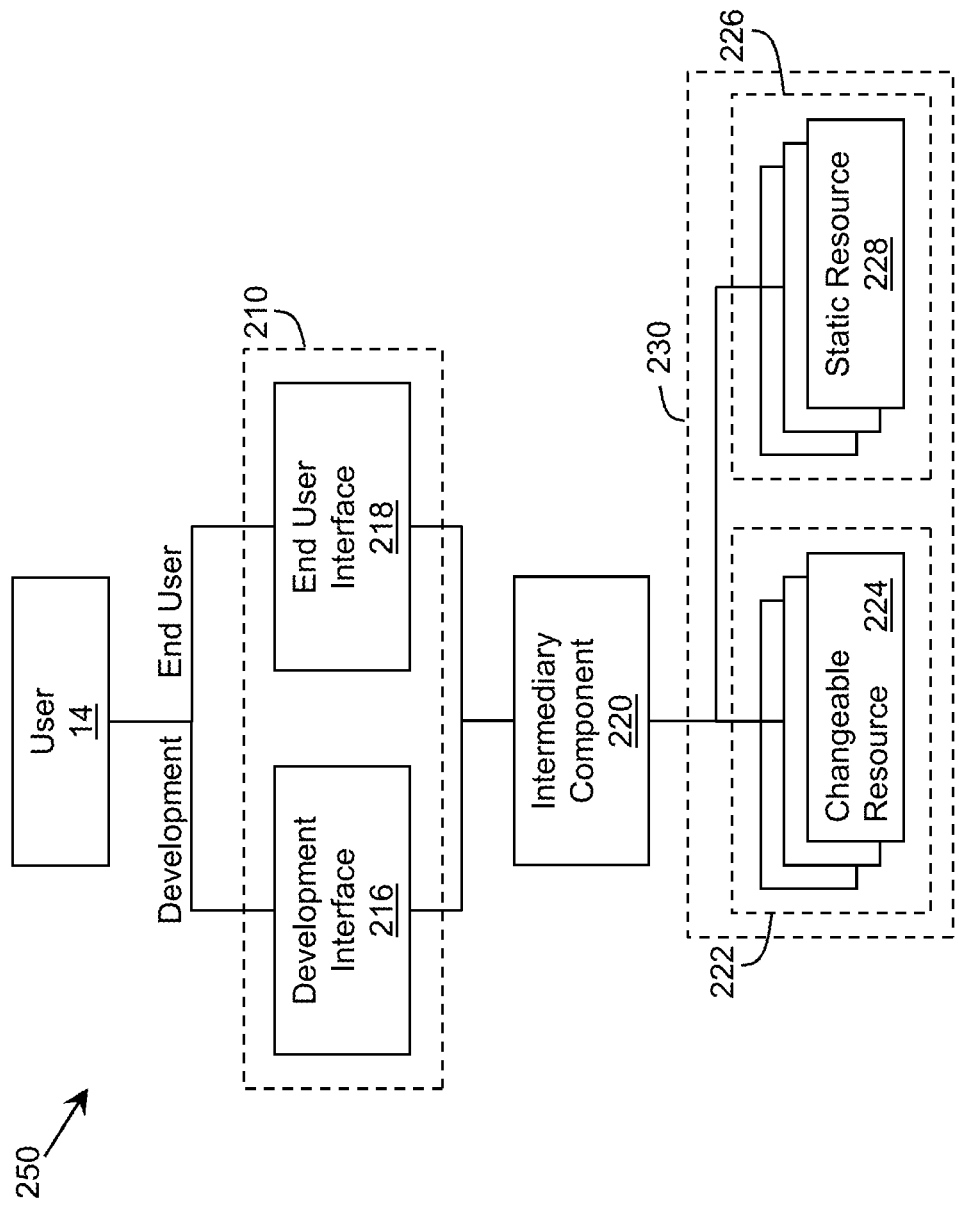
FIG. 2 shows a block diagram of an illustrative conceptual architecture of an environment of a software application according to an embodiment.

In an embodiment, the environment 150 is a modeling environment providing dynamic design, use, and modification of the model resources 134 of the application 130 using a declarative application meta-model that provides for self-modification and the client 14 is a user using the application 130 executing in the modeling environment to perform continuous real-time testing, simulation, deployment, and/or modification of the model resources 134 of the application 130. In this case, the activities that the user can perform using the application 130 can include dynamically modifying one or more aspects of the software application 130 in the runtime environment. To this extent, FIG. 2 shows a block diagram of an illustrative conceptual architecture of an environment 250 of a software application 230 according to an embodiment. As illustrated, the software application 230, by being processed by an intermediary component 220, can manage an application layer 210, which enables a user 14 to use the software application 230 to perform one or more activities, each of which is defined using a set of model resources 134 (FIG. 1) of the software application 230. The application layer 210 includes both a development interface 216, which enables the user 14 to use the application 230 to perform one or more development types of activities on the application 230, and an end user interface 218, which enables the user 14 to use the application 230 to perform one or more end user types of activities.

As used herein, it is understood that the term "activity" means a set of atomic operations to accomplish a goal (e.g., form a complete business/technical process). The goal is set when the activity is initiated (e.g., when a request, such as an HTTP request, is received from a user 14), but the specific atomic operation(s) performed by executing the application 230 to accomplish the goal can vary based on the context information corresponding to each instance of an activity to which the software application 230 is directed. A group of related atomic operations (e.g., a compound operation) is referred to herein as a "task" (e.g., a process fragment). A task is a discrete fragment of an activity that fulfills a defined objective in furtherance of the goal (e.g., complete a form, review a form, submit a form, modify a form, and/or the like). Similar to an activity, the objective of the task is set when the activity is initiated, but the specific atomic operation(s) performed by executing the application 230 to accomplish the goal can vary based on the context information corresponding to the activity. It is understood that some atomic operations and/or tasks can be performed as stand-alone operations (e.g., report generation, basic navigation), apart from a larger task or activity. In this case, the atomic operation is a task and activity in itself or the task is an activity in itself.

An "end user activity" is a type of activity performed by the user 14 using the application 230 in its intended manner to accomplish a goal. For example, if the application 230 manages an end user interface 218 that provides a word processor user interface, the end user activities include those activities performed by the user 14 that utilize the word processor to create a document. Furthermore, the end user activities include those activities performed by the user 14 that customize one or more attributes of the word processor user interface according to the preferences of the user 14, e.g., by modifying a setting exposed to the user 14 (e.g., default attributes for the document), including a "plug-in" component to provide expanded functionality, and/or the like. In an embodiment, end user activities of the application 230 include one or more development activities.

A "development activity" is an activity performed by the user 14 using the application 230, which changes one or more attributes of a set of changeable resources 222 of the application 230. The changeable resources 222 can include model resources 134 that define at least a portion of an application model, which is applied by the application 230 to perform one or more activities. To this extent, a development activity can comprise an activity historically performed by a programmer, a designer, and/or the like, in a software development environment. However, the development interface 216 managed by the application 230 can enable a user 14 to perform the development activity in the environment 250. The development interface 216 can manage any combination of various types of development tools for use by the user 14, such as a modeling environment (e.g., a declarative modeling environment), an integrated development environment, and/or the like. In this manner, the environment 250 can provide dynamic design, use, and modification of the application 230 represented by a collection of models (as embodied in the model resources 134) using a declarative application meta-model that provides for self-modification, and can enable continuous real-time testing, simulation, deployment, and modification of the application 230 represented by the collection of models. In an embodiment, the changeable resources 222 of the application 230 are immutable (static). In this case, a change to a changeable resource 222 results in a new version of the changeable resource 222 being created, which is linked in place of the previous version. The use of immutable resources can provide an ability for the application 230 to provide an auditable history of changes, rollback a change, and/or the like.

As illustrated, resources of the application 230 (or representations thereof) can be processed by an intermediary component 220. The resources can include a set of changeable resources 222 and a set of static resources 226. A changeable resource 224 in the set of changeable resources 222 can comprise a resource that is capable of being dynamically modified by the user 14. In an embodiment, a change to a changeable resource 222, such as a model resource 134, does not require any compilation to take effect in the application 230. A static resource 228 in the set of static resources 226 can comprise a resource that is not capable of being dynamically modified by the user 14. In an embodiment, the set of changeable resources 222 includes a first subset of the model resources 134 shown in FIG. 1, while the set of static resources 226 includes a second subset of the model resources 134. However, it is understood that this is only illustrative, and an embodiment of the environment 250 can include no static resources 228, no changeable resources 224, and/or the like. Furthermore, while the construction service resource 132 (FIG. 1) and the system controller 122 (FIG. 1) can be resources (e.g., as part of the intermediary component 220), it is understood that these resources 132, 122 generally are not changeable by the user 14 in the environment 250.

When the set of changeable resources 222 includes one or more model resources 134 and/or relation information (e.g., declarative relations) for a set of related models, the user 14 can modify a configuration of the software application 230 while an instance of the software application 230 is executing by modifying a configuration of one or more of the model resources 134 and/or relation information. Such a modification can result in an immediate modification to the configuration of the software application 230 (e.g., when the model resources 134 and/or relation information are stored as non-compiled information). Additionally, the modification can have any applicable scope. For example, the modification can modify a configuration of an instance of the modified changeable resource(s) 224 for the user 14, a configuration of the modified changeable resource(s) 224 for use in all subsequent instances and/or of the changeable resource(s) 224, and/or the like. In this manner, the software application 230 can support local variance, global change, and/or the like, and can enable continuous real-time testing, simulation, deployment, and modification of the models and set(s) of related models representing the software application 230.

Each resource representing the software application 230 (e.g., each model resource 134) can have a set of properties. To this extent, when the resource is a changeable resource 224, one or more properties of the changeable resource 224 can be modified by the user 14 while the software application 230 is executing. Furthermore, when a model resource 134 is included in a set of related models, each model in the set of related models can be capable of configuring one or more of a set of properties of the set of related models. In this case, collective properties of the set of related models (e.g., a complex entity, a complex function, and/or the like) can emerge dynamically from interaction of the set of related models, e.g., in real-time during execution of the software application 230. In this manner, the software application 230 can have a set of dynamically emergent properties, which are inherited from the collective properties of the interaction of the set(s) of related models representing the software application 230.

An ability of a user 14 to modify one or more resources of the software application 230 can be provided by a set of models of modification controls, which are included in the model resources 134 of the software application 230. To this extent, the user 14 can be restricted from modifying a static resource 228 in the set of static resources 226 and/or allowed be make modifications to a changeable resource 224 in the set of changeable resources 222 based on the set of models of modification controls. The set of models of modification controls can enable the user 14 to make modifications of any scope (e.g., local variance, global change, and/or the like) to a changeable resource 224. It is understood that the set of models of modification controls can enable/disable an ability to modify one or more resources differently for multiple users. To this extent, whether a resource of the software application 230 is a changeable resource 224 or a static resource 228 can depend on the user 14. Furthermore, the set of models of modification controls can be resources (e.g., model resources 134) of the software application 230, and themselves can be changeable resources 224 for one or more users 14 of the software application 230. In this case, any restrictions on an ability of a user 14 to modify a resource is not an inherent limitation of the software application 230, but rather is a purposeful limitation based on the goals of the software application 230, which can be modified.

The intermediary component 220 can be configured to process each interaction request made by the user 14 as part of an activity (development or end user). In a more particular embodiment, the intermediary component 220 is a generic component, which can be used to execute multiple applications 230 configured to perform activities of any type. The model resources 134 of the software application 230 can define the logic of how the software application 230 performs each activity. To this extent, the intermediary component 220 can operate in a context-independent manner without including or relying on any run-time logic or data specific to the particular application 230 (e.g., the activities performed using the application) on which the intermediary component 220 is operating. In this case, such logic and/or data of the application 230 are defined within the set of changeable resources 222 and/or a set of static resources 226.

In a more particular illustrative embodiment, the intermediary component 220 comprises the system controller 122 (FIG. 1) and the construction service 132 (FIG. 1). In this case, the system controller 122 can receive each request generated by a user 14 and perform pre-processing of the request. As part of processing the request, the system controller 122 can instantiate a container for processing the request, and request a representation of the construction service resource 132 for execution in the container. The construction service resource 132 can further process the request within the container. To this extent, for every atomic operation performed by the application 230, an instance or representation of the same system controller 122 and construction service resource 132 can be used to process the request. The processing of each atomic operation by the construction service resource 132 can include obtaining an instance of a resource identified in the request, such as a changeable resource 224 or a static resource 228, and processing the logic included in the instance of the resource.

By obtaining, in response to receiving a request, an instance of a resource identified in the request, and instances of any other resources required to complete the request, the intermediary component 220 binds the resource(s) of the application 230 in real-time to dynamically construct an implementation of the resource. The intermediary component 220 can bind the resource in real-time for every interaction with the resource (e.g., each request requiring the resource). To this extent, any model resource(s) 134 required to complete the request bind in real-time when processing the request. When the application 230 includes a set of models of modification controls, these models also can bind in real-time. As a result, the application 230 can support customization, personalization, machine-learning (e.g., automated change management), and/or the like.

The application 230 logic can be defined by the application resources 222, 226 (e.g., assets such as models, code, data, policies, and/or the like). In an embodiment, each of the application resources 222, 226 is stateless. That is, each execution of an application resource 222, 226 is performed using resources obtained during the execution. The execution can be in the form of processing representations of the resources, consistent with REST constraints (e.g., stateless 'read' of the system resources) and any state changes can be managed by creating new resource(s) consistent with the principles of immutability (e.g., a stateless 'write' of a new resource back to the system), thereby providing an overall 'stateless' property for the system. By processing representations of the resources, a resource (e.g., model) is separated from implementation and the execution can perform non-blocking reads and writes while managing contention. The logic can be defined in a manner that preserves a loose-coupling between the stateless application resources 222, 226, e.g., by associating the resources 222, 226 with one another using a set of declarative relations for a model resource 134. The association can be made directly, e.g., with explicit identifiers (e.g. Universal Resource Identifiers or URIs or 'links') and/or indirectly, e.g., with metadata references that can be resolved by the intermediary component 220 at run-time based on a context for the corresponding request and/or activity. Furthermore, the logic can be stored in a manner that does not require compilation to effect any changes. In this manner, a change to the application logic (e.g., one or more model resources 134) can be made immediately available.

By enabling the application 230, and the system as a whole, to be defined in a loosely-coupled fashion, the application 230 can provide a dynamic software application framework having many desirable properties (e.g., reflection; under-specification; late-binding; lazy evaluation), and can promote many advantages related to operational responsiveness (e.g., dynamic payload customization based on context and more efficient application development and change management capabilities) and development productivity (e.g., optimal re-use of resources, more efficient application development and change management capabilities).

During execution of the application 230, the intermediary component 220 can receive interaction requests generated by the user 14. An interaction request can request that the application 230 perform a corresponding activity, and can include a reference to one or more of the resources. In response, the intermediary component 220 can dynamically configure each atomic operation for the activity based on its context, and dynamically determine a process flow for performing the activity based on the activity context at the conclusion of each atomic operation, for the entire lifecycle of the activity. The atomic operation of the framework for the application 230 can be an individual system interaction that is performed by the intermediary component 220 by calling a single resource, e.g., a model resource 134. In this case, the intermediary component 220 comprises an agent acting between the user 14 requesting an atomic operation and the resource(s) 222, 226 configured to perform the atomic operation per the related model. The intermediary component 220 provides a mechanism for evaluating the request relative to activity context, customizing the deliverable (payload) for each atomic operation and directing the user 14 to the next valid interaction(s) for continuing to perform the activity based on use of context information in support of the activity. In this manner, the intermediary component 220 mediates interactions between the user 14 and a group of loosely-coupled resources 222, 226 to enable the user 14 to perform an activity using the application 230 per the related models in the resources 222, 226.

Figure 3:
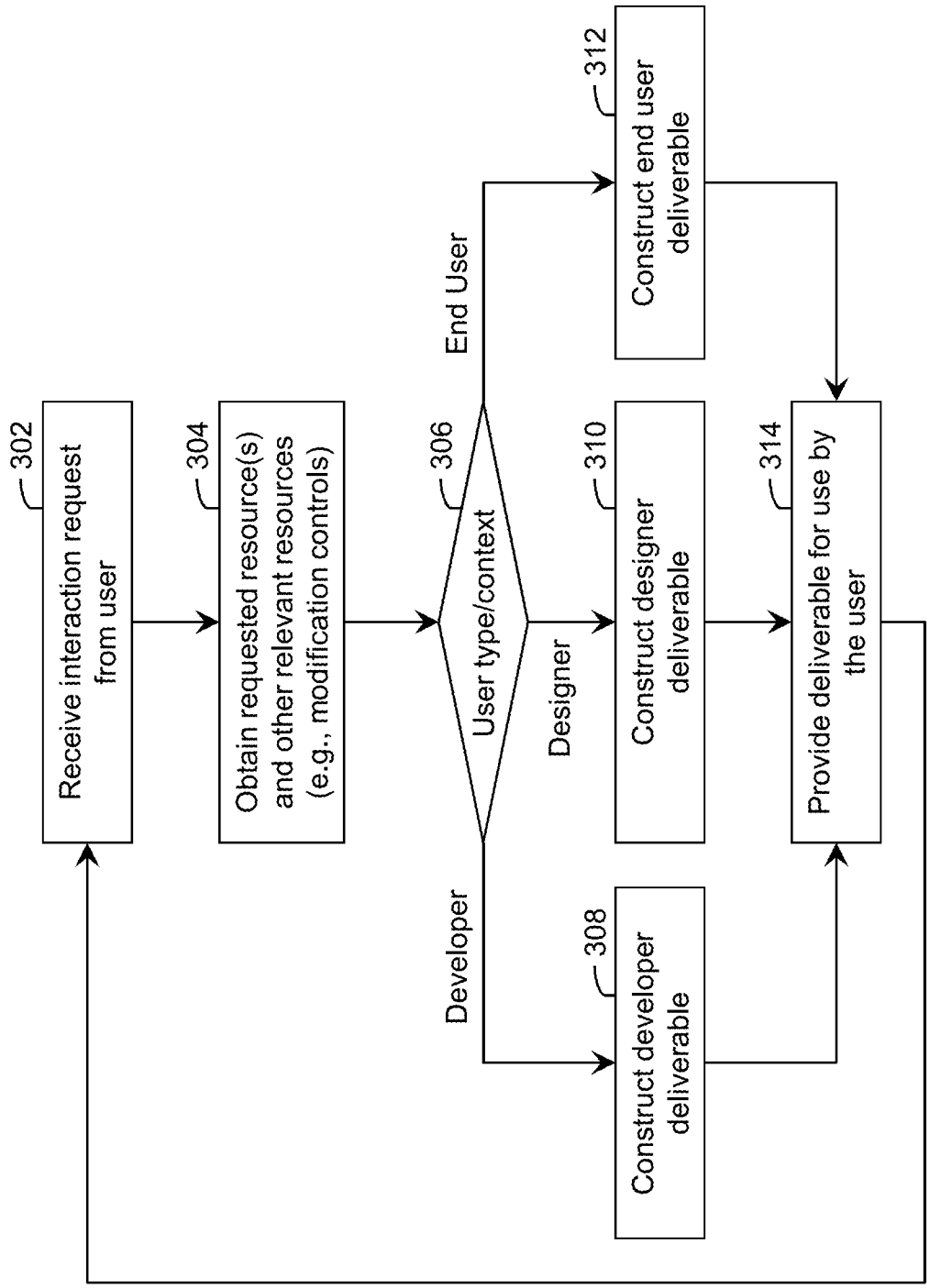
FIG. 3 shows an illustrative process for processing a user request according to an embodiment.

As described herein, the activity can be an end user activity or a development activity. To this extent, FIG. 3 shows an illustrative process for processing a user request, which can be implemented by the computer system 152 (FIG. 1) executing the application 230 (FIG. 2), according to an embodiment. Referring to FIGS. 2 and 3, in action 302, the intermediary component 220 receives an interaction request from a user 14. As discussed herein, each interaction request can include an identifier corresponding to a model resource (e.g., a changeable resource 224 or a static resource 228) for processing the interaction request. In action 304, the intermediary component 220 can obtain representation(s) of the requested resource(s) using the corresponding identifier(s) and can obtain representation(s) of other relevant resources, if any, in order to process the request. The other relevant resources can include resources referenced by the requested resource(s), resources defining policies of the application 230, resources defining a context of the request or a corresponding activity, and/or the like. The policies can include modification controls, which can identify the activities that the user 14 is allowed to perform using the application 230.

In action 306, the intermediary component 220 can evaluate the context of the request and the type of user 14 (e.g., the privileges of the user) in order to construct the deliverable. For example, the intermediary component 220 can process representation(s) of the other relevant resource(s) in order to determine the context and/or the type of the user 14. Based on the context of the request (e.g., the requested action, previous requested actions, the type of the user 14, and/or the like), the intermediary component 220 can construct a deliverable, which includes data and/or options for the user 14. To this extent, the intermediary component 220 can construct and provide, in response to a request, deliverables that differ from one another based on the context of the request (the type of the user 14, corresponding activity, and/or the like) per the related model(s) in the resources 222, 226.

In an illustrative embodiment, the intermediary component 220 can evaluate the user 14 type and/or the context of the request as one of a developer, a designer, or an end user. When the intermediary component 220 evaluates the user 14 as a developer, in action 308, the intermediary component 220 can construct a developer deliverable using a set of resources of the application 230. The developer deliverable can include data and/or one or more next activities which enable the user 14 to perform one or more development activities (e.g., view/edit/add a changeable resource 224 in the set of changeable resources 222) on the application 230. Similarly, when the intermediary component 220 evaluates the user 14 as a designer, in action 310, the intermediary component 220 can construct a designer deliverable using a set of resources of the application 230. The designer deliverable can include data and/or one or more next activities which enable the user 14 to perform one or more design activities (e.g., view/edit/modify one or more resource connections declaratively defined in the set of changeable resources 224) on the application 230. Additionally, when the intermediary component 220 evaluates the user 14 as an end user, in action 312, the intermediary component 220 can construct an end user deliverable using a set of resources of the application 230. The end user deliverable can include data and/or one or more next activities which enable the user 14 to perform one or more end user activities.

Regardless, in process 314, the intermediary component 220 can provide the deliverable for use by the user 14. For example, the deliverable can comprise a graphical user interface presented to the user 14 in response to the interaction request. While the development interface 216 is shown separately from the end user interface 218, it is understood that a deliverable can enable the user 14 to request both one or more development activities as well as one or more end user activities. For example, each of the developer and design deliverables can enable the user 14 to perform one or more end user actions. Similarly, an end user deliverable can enable the user 14 to request/perform one or more development activities on the application 230. Furthermore, it is understood that the intermediary component 220 can continually evaluate the type of user 14 as the user 14 utilizes the application 230 and the corresponding context changes. For example, a user 14 having developer privileges may be evaluated by the intermediary component 220 as an end user due to a context created by previous interactions of the user 14 with the application 230.

In an embodiment, the development interface 216 provides a declarative modeling environment interface for the user 14. In this case, the environment 250 can enable the user 14 (e.g., a designer) to generate and/or modify a dynamic, context-enhanced, software application 230, which is defined declaratively, using model resources 134 (FIG. 1), without requiring the user 14 to have the skill set of a software developer to write explicit 'hard-coded' connections to discrete assets as is the case with conventional programming. The development interface 216 can provide an abstraction, hiding the actual underlying integration complexity, and providing a software development framework capable of dynamically identifying, retrieving, connecting, and transforming discrete components based on atomic-operation context. For example, the development interface 216 can enable the user 14 to generate and/or modify a set of related models using a set of declarative relations. In contrast to SOA/BPEL approaches, where processes are static rather than dynamic constructions (e.g., "mash-ups"), the development interface 216 can enable bindings to be prescribed declaratively rather than procedurally, and components can be open resources (e.g., modifiable) rather than closed services. While the environment 250 is shown including an application 230, which manages an application layer 210 with an integrated development interface 216, it is understood that the development interface 216 can be managed separately from the application 230 within a computing environment.

In an embodiment, the application 230 can comprise an application for designing models (e.g., a meta-meta model or a model for modeling models). In a more particular embodiment, the application 230 comprises an application for modeling other software applications or processes, which also can be executed by the intermediary component 220. In this case, the application 230 can include model resources 134 (FIG. 1) specifically for the purpose of designing models for governance policies, application logic, business entities, business processes, service interface, system connections, and/or the like. Furthermore, the application 230 can automatically embed one or more model resources 134 into a new meta-model for the software application or process, which can represent one or more system-wide capabilities, e.g., in order to standardize system controls such as system security, state management, machine tagging and indexing, configuration controls, and/or the like. A user 14 of the application 230 also can embed one or more models into the new meta-model, e.g., in order to standardize governance such as security policies, version control, enterprise search, and/or the like. In an embodiment, one or more of the model resources 134 of the software application or process can support an activity relating to a system control for configuring one or more models of the meta-model for the software application or process during its use.

As a result, the meta-model can be declaratively modified by a user of the software application or process in real-time without disruption to the instance of the software application or process or its meta-model, or the system as a whole (e.g., no programming, code-compiling, code-build, deployment, or the like).

Figure 4:
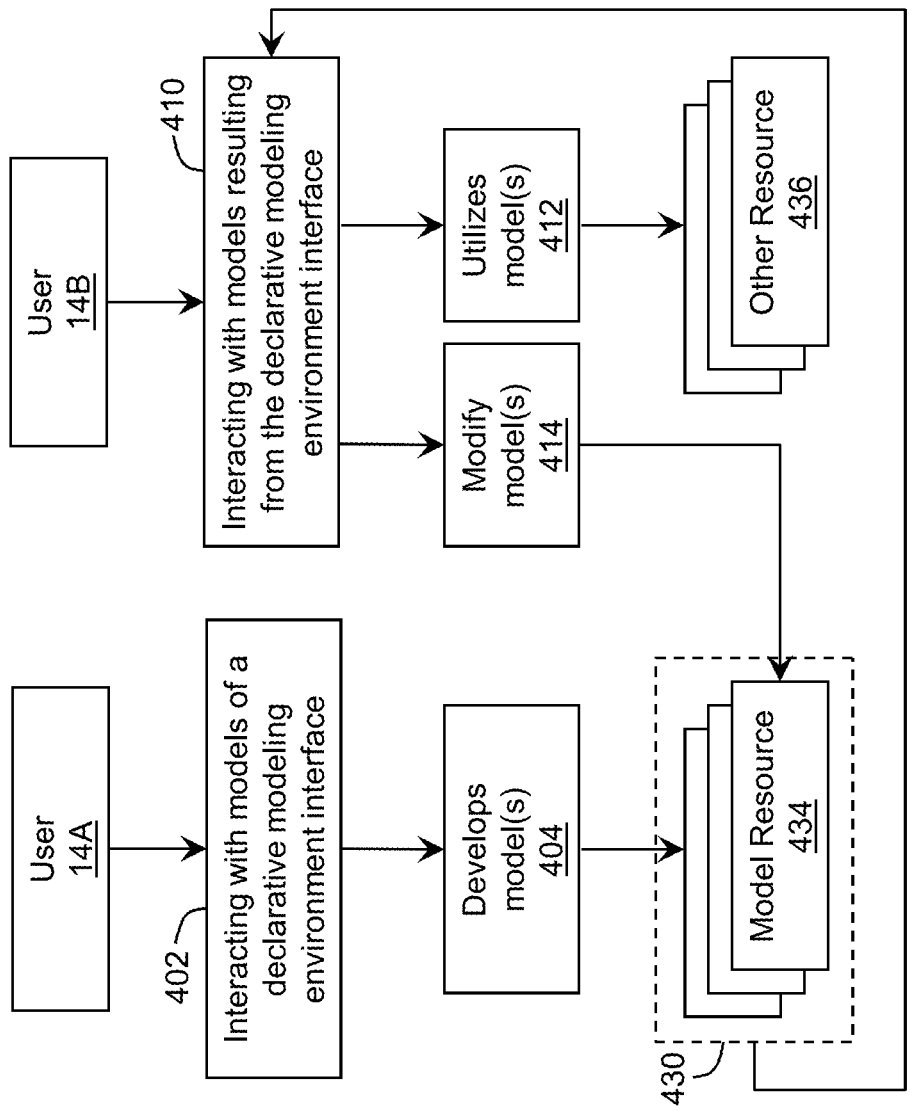
FIG. 4 shows an illustrative flow diagram of interactions of users with a collection of model resources according to an embodiment.

FIG. 4 shows an illustrative flow diagram of interactions of users 14A, 14B with a collection of model resources 430 according to an embodiment. In action 402, a user 14A can interact with models of a declarative modeling environment interface (e.g., the development interface 216 of FIG. 2) and develop one or more models 404. The models 404 can be stored as model resource(s) 434 of the collection of model resources 430. Furthermore, in action 410, a user 14B can interact with the collection of model resources 434, which result from the declarative modeling environment interface, to utilize one or more of the model(s) in action 412. The utilization of model(s) can result in the generation of other resources 436. Additionally, the user 14B can modify one or more of the model(s) in action 414, which can result in one or more of the model resources 434 in the collection of model resources 430 being modified. During a subsequent interaction (by the user 14B and/or other users) with the collection of model resources 430, the modified model resource(s) 434 can be provided for use.

While FIG. 4 shows two users 14A, 14B for clarity, it is understood that the same individual could interact with models of a declarative modeling environment interface as well as interact with models resulting from the declarative modeling environment interface. Similarly, it is understood that the users shown and discussed in conjunction with FIGS. 2-4 can comprise human users or system users. To this extent, the development and end user interfaces described herein can be configured to support human interaction (e.g., through the generation of and interaction with graphical user interfaces) and/or system interaction (e.g., through the management of an application programming interface (API), or the like).

As shown and described herein in conjunction with FIG. 2, a development interface 216 can work with a web-style repository where all system artifacts (e.g., data; code; policies, as well as adaptors to third-party services, systems and devices) are stored as loosely-coupled resources (e.g., dynamic, static, development, runtime, and/or the like). The coupling of the resources is defined via the models described herein. In web-style architectural terms (e.g., Representational State Transfer or "REST"), resources are any information, regardless of media type, addressable by a Uniform Resource Identifier (URI). In this case, an application, such as an application described herein, can be a collection of loosely-coupled stateless resources that bind dynamically at run-time through the model(s); they are not "hard-coded." By preserving the loose-coupling of the resources, the development interface 216 can enable the development of a software application, and an overall system, having advantageous properties in regards to contextualization and adaptation.

Figure 5:
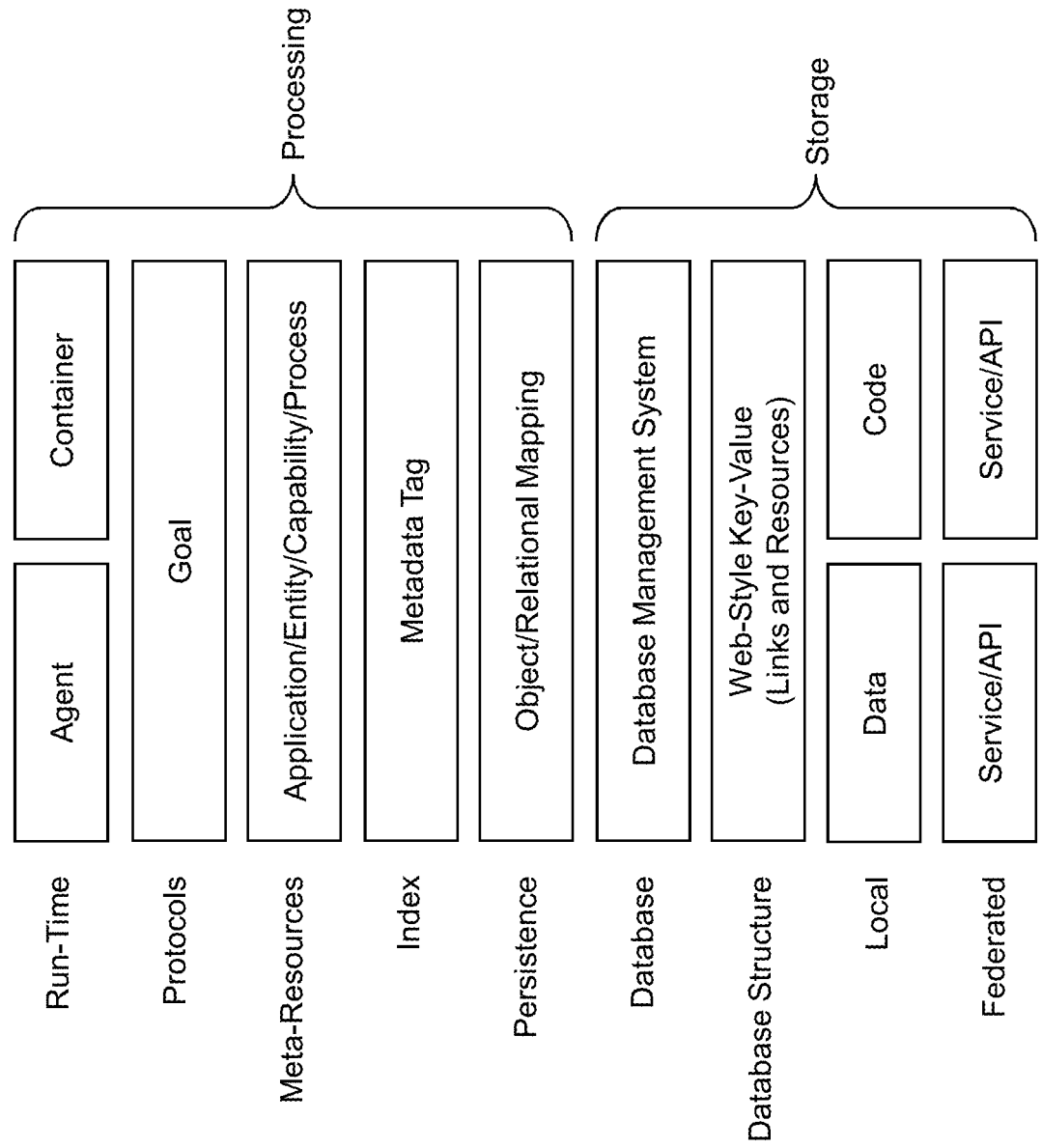
FIG. 5 shows an illustrative conceptual architecture of various types of application components according to an embodiment.

FIG. 5 shows an illustrative conceptual architecture of the various types of application components according to an embodiment. As illustrated, the components can include two classes of components, those components that are utilized in processing a request (e.g., performing an activity) and those components that are utilized to store data. The processing components can include various types of components including, for example: run-time resources (e.g., agents, containers); protocols (e.g., goals); meta-resources (e.g., applications (activities), entities, capabilities, processes);

indexes (e.g., metadata tags), persistence (e.g., object/relational mapping); and/or the like. Similarly, the storage components can include various types of components including, for example: database (e.g., a relational database management system (RDBMS)); database structure (e.g., a web-style key-value defining links and resources); local storage (e.g., data and code); federated storage (e.g., services/application program interfaces (APIs)); and/or the like.

Figure 6:
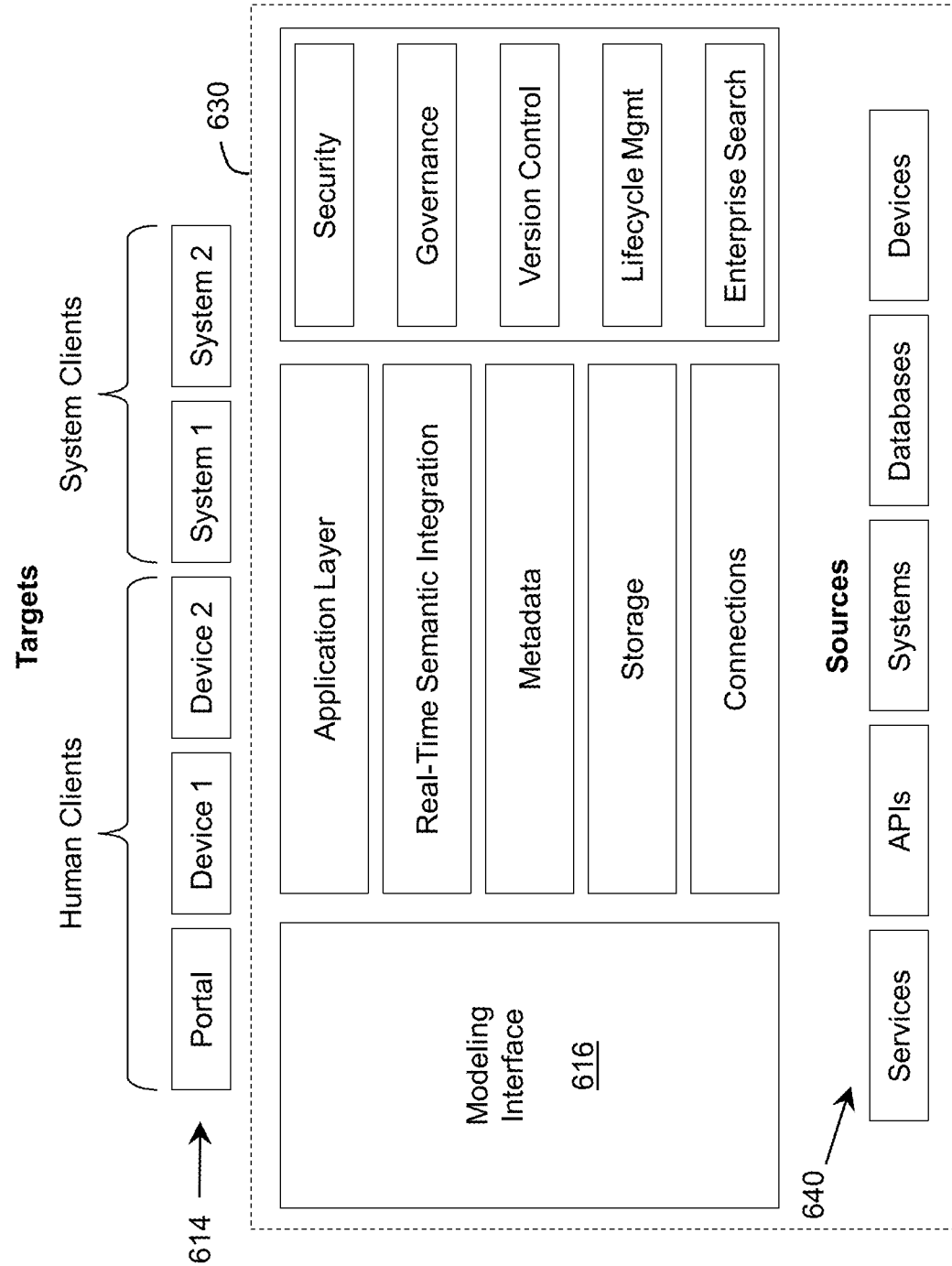
FIG. 6 shows an illustrative conceptual diagram of an application according to an embodiment.

FIG. 6 shows an illustrative conceptual diagram of an application 630 according to an embodiment. As illustrated, the application 630 can provide an intermediary between any of a plurality of types of targets 614 and any of a plurality of types of sources 640 for any specified workload. The application 630 can include resources, such as one or more model resources 134 (FIG. 1), which implement security and governance for the interactions between a target 614 and a source 640. Additional resources (e.g., model resources 134) can implement version control, lifecycle management, enterprise search, and/or the like. In this manner, the application 630 can construct its own components in real-time in support of interactions, thereby enabling these components to be modified, configured, extended, and/or the like. Furthermore, the intermediary can include a modeling interface 616, which enables a target 614 to modify one or more of the sources 640 and/or one or more model resources 134, which define the interaction between the targets 614 and the sources 640 (e.g., metadata, connections, and/or the like).

Figure 7:
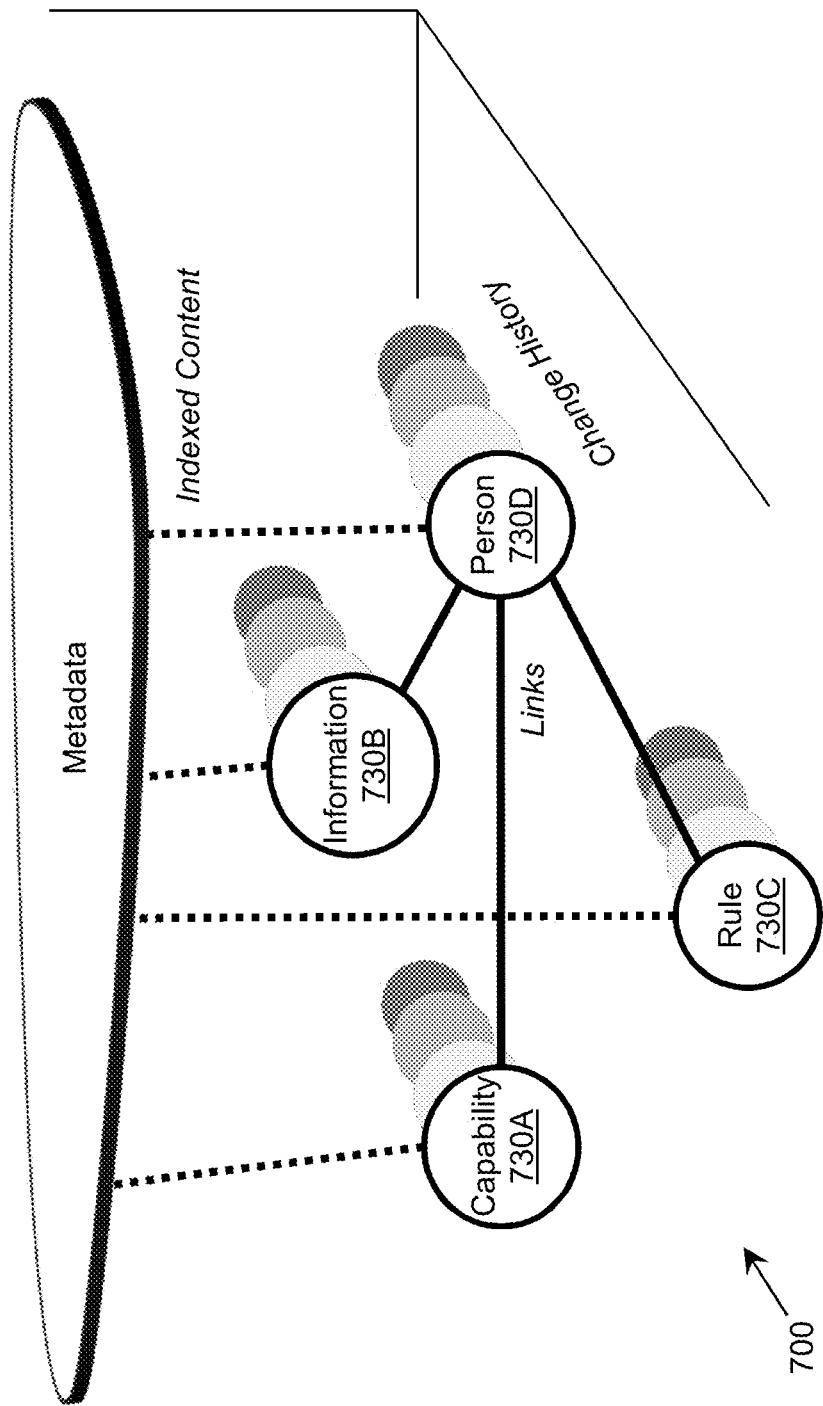
FIG. 7 shows an illustrative conceptual diagram of an information space for an application according to an embodiment.

FIG. 7 shows an illustrative conceptual diagram of an information space 700 for an application, such as the application 130 (FIG. 1), according to an embodiment. As illustrated, various types of resources (data and code), such as a capability 730A, information 730B, a rule 730C, a person 730D, and/or the like, can be interconnected by a set of links, which also are resources of the application. Furthermore, the information space 700 can include indexed content resources, which comprise metadata for the various types of resources and links. For each resource, the information space 700 also can include a change history, thereby making the information space 700 a hyper-relational information space. By automatically indexing all new and changed resources, the application can continuously create new semantic pathways for search, sort, filter, and/or like, for clients and the intermediary component. In this way, the application can maintain the environment it uses and promote its ability to evolve (e.g., change).

FIG. 8 shows an illustrative processing cycle 800 of an event, which can be implemented by an application, such as the application 230 (FIG. 2), described herein, according to an embodiment. Referring to FIGS. 2 and 8, initially, an event occurs, such as a request is generated by a human or system client, a scheduled event is triggered, and/or the like. An agent, e.g., the intermediary component 220, is called to process the event. The agent interprets a model for the event using representations of various resources associated with the event, including one or more model resources of the application 230. The agent uses the model to evaluate links, metadata, and/or the like, to identify all the relevant resources of the application 230. The agent processes the event using representations of all the relevant resources. The processing can include performing a mash-up of various concerns, performing real-time semantic application integration, run-time interaction with a container/cache, and/or the like. The agent ends the processing by providing a custom deliverable, such as an interface or other type of payload to the source of the event, and updates database(s) with details on the processing (e.g., ACID transaction). In this manner, the agent can process each event in a manner that ensures a targeted response based on the context of the event.

Returning to FIG. 1, as described herein, logic for an application, such as the application 230, can be defined within the resources 222, 226 of the application 230. In an embodiment, the application 230 uniformly manages all end user data and executable data (program code) as loosely coupled resources 222, 226 using a set of models included in the resources 222, 226. The loose coupling can be defined by a set of declarative relations (e.g., links), each of which includes a unique identifier and a reference to at least one resource 224, 228, thereby creating an undirected graph (e.g., a sparse matrix). The application 230 can store the declarative relations, for example, as key-value pairs in a relational database. Furthermore, the application 230 can store data corresponding to each transaction with the application 230 (e.g., an interaction) in the relational database, e.g., as in an ACID transaction.

In an embodiment, when a user 14 performs an activity that updates a changeable resource 224 of the application 230, the application 230 creates a new resource 224, while maintaining the previous version of the changeable resource 224. Additionally, the application 230 can implement each activity as a set of loosely-coupled tasks, each of which is executed as an asynchronous ACID transaction. In this manner, the application 230 can support global version control, generation of an audit trail, roll back of all transactions (end user and development), referential integrity (e.g., trace), statelessness (scalability), and/or the like.

In an embodiment, each resource 224, 228 of the application 230 is an entity, which can be discrete or complex, or a function, which can be complex. An "entity resource" can comprise a data resource, which defines any object relevant to an activity performed using the application 230. An entity resource can be a model (e.g., a meta-resource), which includes one or more relationships to other resources of the application 230. The other resources can include, for example, any combination of: another model; an atomic resource; a work-order resource (which is a type of under-specified meta-resource); and/or the like. A "function resource" can comprise executable data, and also can include a relationship to one or more other resources (a complex function resource). In either case, the development interface 216 can enable a user 14 to edit/modify/create an entity or a function resource using links, metadata, and/or the like, with a declarative modeling solution. As described herein, these links, metadata, and/or the like, can be interpreted at run-time, e.g., by the intermediary component 220. Furthermore, a resource can inherit one or more properties or behavior from a relationship with another resource. For example, a person resource can be related to a system administrators resource, which defines one or more requirements applied to the person resource as a result of the relationship. Subsequently, the intermediary component 220 can use a change request process defined in the system administrators resource, e.g., in response to a state change request by the person associated with the person entity resource. Defining the application 230 using these resources enables a non-disruptive evolution of complex objects and entities based on the corresponding new relationships and modified resources, thereby enabling development of an application 230, which is flexible, adaptable, and/or scalable.

An application 230 created using the resources 222, 226 can include or be processed by an intermediary component 220, which processes representations of the resources 222, 226 to manage an interface layer 210. For example, the intermediary component 220 can interpret a forest graph defined by the resources 222, 226 during execution to generate a customized deliverable in response to each request. In an embodiment, the intermediary component 220 utilizes a query model to interpret the graph using, for example, sparse matrix processing of the system method to dynamically generate and project a schema for the resources 222, 226 during the processing of an interaction request. The intermediary component 220 can comprise a goal-oriented reactive agent, which implements a generic and extensible algorithm, independent of the particular activities performed using the application 230, by evaluating and processing representations of the resources 222, 226 in response to user interactions. The intermediary component 220 can perform complex runtime query, transformation, and orchestration, and can handle all connection complexity in real time. Each activity performed using the application 230 can be implemented as a series of stateless, asynchronous transactions, which are performed by the intermediary component 220 and defined in the set of resources 222, 226.

In an embodiment, the intermediary component 220 uses a semantic query and transformation algorithm (e.g., a work order) to recursively retrieve and transform a set of resources 222, 226 to: evaluate interaction context; construct a custom response (deliverable); and recommend next-best-action(s) to the user 14. The intermediary component 220 can use a goal-seeking reflective strategy, which itself can be a model, to evaluate the interaction context and use a form of a dynamic pipe-and-filter to rapidly build an interaction-specific network of resources 222, 226. The intermediary component 220 can process the pipe-and-filter to create a set of custom deliverables based on the interaction context. In this manner, the intermediary component 220 configures the set of resources 222, 226 to process each interaction.

As illustrated, the application 230 can be defined such that the 'what' (as defined by the set of resources 222, 226) is separate from the 'how' (as implemented by the intermediary component 220). To this extent, the entire application 230 can be defined as a "plan" as the term is used in computer science using a set of models as described herein. Defining the application 230 in such a manner enables a high degree of interoperability and adaptability to be included in the application 230. For example, by utilizing late-binding/lazy evaluation, the application 230 can improve consideration of context throughout an activity (e.g., evaluation of the next actions, construction of deliverables, and/or the like). The use of strong 'late' typing enables the intermediary component 220 to construct an interaction-specific ontology in which all schemas are projections defined in the set of resources 222, 226 and the deliverable (e.g., a user interface) is derived in response to each request. A unified design for defining multiple applications 230 promotes a high degree of data and/or code re-use during the development of these applications 230. Furthermore, additional benefits, such as system-wide security, governance, version control, and/or the like, can be readily implemented in each application 230 since the resources 222, 226 can construct these in a similar manner.

Additionally, the application 230 can implement storage in a manner that provides additional benefits to the development and maintenance of the application 230. For example, a data storage architecture for the set of resources 222, 226 can be schema-less and utilize generic and extensible storage. Logical data storage can be separated from physical storage to make application development and maintenance easier, e.g., distributed resources can be virtualized, connection/transformation complexity can be hidden, and/or the like. By treating application data and code uniformly (e.g., both are resources 222, 226 of the application 230), system-wide properties of the application 230 can be supported. Use of a schema-less storage design can optimize the analytics performed by the intermediary component 220. Furthermore, loose coupling between the resources 222, 226 separates concerns in the development and maintenance of the resources 222, 226 of the application 230.

As described herein, regardless of the role of a particular user 14 (e.g., end user, designer, developer, and/or the like), each interaction of the user 14 with the application 230 can be mediated by the intermediary component 220 (acting as an agent). To this extent, each type of user 14 has an ability to create, read, update, or delete resources 222, 226 through interactions with the application 230, which the application 230 processes using a set of work order resources that effectively determine the form of the operations (create, read, update, delete). In this manner, each type of user 14 experiences the application 230 in the same way. The operations capable of being performed by any particular user 14 on any particular resource 222, 226 can be enforced through a set of modification control resources defined in the resources 222, 226. Each interaction of a user 14 with the application 230 can be persisted, e.g., as in an ACID database transaction.

Using a development interface 216 described herein, an application 230 can be developed and managed with policies (e.g., system management; enterprise governance; domain logic; business rules; and/or the like) that are loosely-coupled from program code and data. This allows the policies to be mixed-in based on context for improved (e.g., optimal) policy precision. Furthermore, this allows programmers to develop code extensions without worrying about pre-defining an interface to the application 230. Programmers can leave integration of the extension to non-technical business personnel (e.g., designers), who can use the development interface 216 to parameterize the code declaratively with relevant policies. Non-technical business personnel can in turn, where appropriate, pass controls on to the end users of the application 230, allowing the users 14 to flexibly adapt their experience to circumstances. This separation of concerns can promote re-use of development assets by delegating control to the entity (e.g., the purchaser or end user), which can now develop and evolve the application 230 according to the requirements of the entity, independent of information technology personnel or the software developer. In addition, the flexible re-use of existing code can reduce application testing demands for the application 230 versus applications created using prior approaches.

In an illustrative process, software developers (e.g., a developer user 14) can add code files as resources 222, 226 to a web-style repository (e.g., JavaScript functions, RESTful endpoints, etc.) of the application 230 using the development interface 216. Additionally, using the development interface 216, a non-technical user (e.g., a designer user 14) can model data (e.g., business entities, reference data) and policies, which become additional resources 222, 226 in the web-style repository. The same or other non-technical user 14 also can use the development interface 216 to model the application 230, e.g., by declaratively associating data, code and policies directly with explicit identifiers (e.g., Uniform Resource Identifiers or URIs or 'links') or indirectly, with metadata references that are resolved by the intermediary component 220 at run-time based on activity context.

As a result, the development interface 216 can allow non-technical personnel to seamlessly declaratively relate distributed and heterogeneous resources 222, 226 using a modeling approach, without worrying about source, format or connection details. The user 14 can use the development interface 216 to configure the relations and resources 222, 226 independent of traditional software development (e.g., writing program code). The development interface 216 can enable the user 14 to define one or more relations, which are evaluated using a metadata query that binds at runtime. Such a query can enable the user 14 to defer completion of the application definition until runtime, when the metadata reference(s) can be resolved for individual interactions, thereby allowing each interaction to be personalized/customized (e.g., interaction-specific variance), and the application definition to be automatically changed based on activity.

Furthermore, the development interface 216 can comprise an interface, for use by a developer (designer) 14, which includes a searchable, filterable sortable, and/or the like, directory of all of the resources 222, 226 to facilitate navigation and/or reuse of the resources 222, 226 in the application 230 by the developer user 14. In this manner, the development interface 216 can promote re-usability of the resources 222, 226 by making it easy for a user 14 to: relate existing resources 222, 226 (e.g., by defining and/or modifying a set of models); embed metadata queries that bind in real time; create/add resources 222, 226 that are "well formed" for subsequent re-use; and/or the like.

The development interface 216 can support highly-interactive user-experiences as described herein. For example, instead of following a rigid, predetermined flowchart, a process performed using the application 230 can adapt to circumstances and a workflow performed using the application 230 can be as flexible as possible or as procedural as necessary. Such support can improve an ability of the application 230 to respond to changes in an environment, such as a dynamic business environment, thereby improving business agility and sustainability of the application 230. The development interface 216 can enable development of an application 230 that provides flexibility at the edges of an entity, e.g., where the entity interfaces with its customers, staff, and/or partners.

In an embodiment, modeling an application 230 using the development interface 216 involves developing a set of tasks (e.g., by developing models), wherein each task is a resource 222, 226 for an atomic operation performed using the application 230. Each task can be a generic policy-based template that is designed to leverage interaction context. When building an application 230 using the development interface 216, sets of tasks can be individually configured and linked together by policies for pre- and post-conditions (e.g., what atomic operation(s) can follow next). This allows the specific content and flow of each running activity of the application 230 to be directed by its business context—in other words, context is able to influence the nature and sequence of the actual work conducted.

When developing tasks of the application 230 using the development interface 216, non-technical personnel can add restrictive policies (e.g., modification controls) to the set of resources 222, 226 in order to limit choices of the users 14, e.g., for compliance purposes, or can add looser policies to the set of resources 222, 226 in order to extend greater control to the business users. In this way, processes performed using the application 230 are as flexible as possible and as procedural as necessary, task-by-task, without requiring technology-switching, which is required when using a procedural process of prior art applications.

Using the development interface 216, processes for the application 230 can be loosely defined by the developer user 14. Tasks performed using the application 230 can be uncoupled from rigid flowcharts or state-transition diagrams, and instead can be combined dynamically by the intermediary component 220 (e.g., in response to an interaction request) based on rules included in the end user resources 222, 226, allowing the order of events to align dynamically with each case's requirements. This enables the application 230 to perform adaptive processes that unfold without fixed assumptions on the timing, sequence or frequency of actions or events. The result can be a situationally-aware application 230, which can recommend or direct actions to the user 14, can direct strict compliance, or can empower process-participants to adapt processes in-flight so they can co-create their experience, all based on applicable policies defined in the resources 222, 226.

The development interface 216 can be used by a developer user 14 to develop and/or maintain the application 230, which can be utilized for complex human workflows that are subject to routine variance and change, and can benefit from dynamic decision support (e.g., research & development; patient management; financial services; investigation-work; emergency response; project management; etc.). The development interface 216 also can be used for instrumenting a network and sensor monitoring application 230 for the "Internet of Things" (e.g., automatic server provisioning; energy/utility management; remote product monitoring; etc.). The development interface 216 can provide an effective tool for implementing and maintaining these adaptive and personalized applications 230, and an effective tool through which evolution of these types of applications 230 can be facilitated.

The development interface 216 also can include/provide access to a set of libraries of preexisting capabilities that are available for reuse and extension by both software developers and nontechnical personnel (e.g., a set of utility resources 138 shown in FIG. 1). The developer user 14 can add one or more resources 222, 226 to the application 230, which reference one or more of the resources 138, thereby making the resource 138 accessible during execution of the application 230. Since these preexisting capabilities are simply other code resources, or sets of resources, without pre-defined interfaces constraining their use, they also can be adapted to context by the intermediary component 220 while executing the application 230. These resources 138 represent "Adaptive APIs" that provide generalized functions that can be declaratively parameterized using the development interface 216. By decoupling design from implementation, these Adaptive APIs can afford a developer user 14 the power of meta-programming without having to manage or even understand the low-level implementation details.

An Adaptive API library can include rich system application level concepts that can be declaratively configured by the developer user 14 for related but distinct purposes in various applications 230, including: portal; enterprise search; work lists; dashboards; dynamic forms; adaptive process; document management; interactive reports; meeting management; document generation; etc. In addition, the Adaptive API library can include APIs for enabling the developer user 14 to make a relative reference at design-time to any 'subject' or to use any model that is resolved by the intermediary component 220 at run-time, including:

Data: entities (e.g., people; locations; departments; etc.); metadata; reference data; etc.
Capabilities: functions; services; systems; devices; etc.
Policies: business rules; style sheets; etc.

Development of an application 230 using the development interface 216 can enable one or more of the following advantages to be present in the application 230:

| | |
|---|---|
| Security | Security policies (HTTPS; LDAP; SAML; encryption; etc.) can be mixed-in at run-time |
| Version/Source Control | All resources (data; code; policies; third party adaptors) at all levels (system; enterprise; application) can be automatically version-controlled with detailed audit history and rollback capability |
| Governance | Any cross-cutting concern or capability can be mixed-in at run-time based on context |
| Business Logic | Policies can be loosely-coupled from code and data so business logic can be mixed-in based on context for optimal business relevance and policy precision |
| Enterprise Search | System-wide indexing, tagging, metadata management can provide enterprise search across all resources - everything (apps; cases/processes; data; code; policies; third-party adaptors) |
| Reliable Transactions | ACID semantics can be applied universally for reliable code and data with distributed, stateless and asynchronous transactions to provide near linear-scalability across heterogeneous environment |
| Integration/Transformation | Heterogeneous data, services, systems, devices and languages can be transformed on demand abstracting all location, connection and media-type complexity, also applies to polyform persistence and user interface |
| Virtual Objects | Can code independent extensions without worrying about pre-defining an interface, can decouple code from domain logic and data source and add to a rich library of Virtual Objects (Adaptive APIs) - transformations and controls applied at run-time |
| User Interface | Can code once for any target (device; browser; DOM), user interface can be dynamically generated based on interaction policies, including style and behavior |
| Adaptive Process | Processes can be a series of stateless interactions where user interface is derived based on context and system manages data state through application lifecycle |
| Change and Lifecycle Management | Changes to system resources (apps; data; code; policies; third-party adaptors) can be subject to policy-driven processes for approvals (including dynamic dependency maps) complimenting a system-wide version control for complete lifecycle management |
| Co-evolution | Resource versions can be part of context so app designer can use policies to 'follow' a specific version of a resource or the 'current' version of a resource, enabling applications to seamlessly co-evolve with their constituent parts |
| Simulation(and/or Testing) | Development environment can use a shared run-time so simulation (and/or testing) is a function of application status |
| Enterprise Multi-tenancy | Enterprise can leverage multi-tenancy for internal benefit using access policies to drive physical and virtual partitioning |

The development interface 216 can support standards-based development (e.g., JavaScript; XML; XSLT; HTML/HTML5; etc.) and can be designed for integration with third party services, systems and devices. As a result, an application 230 can be extended by social (e.g., LinkedIn; Twitter; Facebook; etc.), mobile (e.g., iPhone; Android; etc.), cloud (e.g., Salesforce.com; SuccessFactors; etc.), open source (e.g., Pentaho reporting; JBoss rules; etc.), methods (e.g., MapReduce; Open Source R; etc.), and/or the like, resources. In all cases, the development interface 216 can enable the developer user 14 to connect to a resource once, and use the resource many times.

In an embodiment, the development interface 216 is managed by a web-based run-time development application that runs alongside the business application(s) that were created with it. Alternatively, as shown and described in conjunction with FIG. 2, the development interface 216 can be part of an application layer 210 managed by an application 230. Either configuration removes a longstanding IT divide between design and execution environments.

In either case, with the development interface 216, all the users 14 involved in building, testing, and maintenance of application(s) 230 can work in the same 'space' at the same time as other users 14 (e.g., business users) that use the application(s) 230—they are all just users with different roles and different rights with respect to the creation, modification, deletion, and/or the like, of the resources 222, 226 of the application(s) 230. A shared environment 250 including the development interface 216 and the application(s) 230 can support a new form of enterprise collaboration—real-time change management—enabling an exponential increase in development productivity and operational responsiveness.

Historically, change management has been disconnected from the front line business operations. Frequently, business matters wait at the end of long queues for committees to prioritize items and delegate resources far removed from the point of need. This gap imposes a "tax" on enterprise agility and leads frustrated users to create shadow systems, compounding change management challenges in a self-reinforcing negative loop.

In an embodiment, a developer user 14 uses the development interface 216 to define models using declarative relationships between various resources 222, 226 in order to completely define a software application 230 at the application layer (e.g., all business activities to be performed by the software application 230) with no compiled program code and without requiring the use of third-party middleware (unless to implement a specifically desired integration for a business purpose). In this case, the only differences between unreleased code and production code for the software application 230 are status and permissions. This means that code, policy and data model changes to the software application 230 can be requested in-flight using the development interface 216. The 'owners' of the respective application 230 can validate requests, make and/or approve the change, or escalate to an official or a committee using the development interface 216. The development interface 216 can facilitate review by providing dependency maps, versioning all resources 222, 226, maintaining detailed audit trails and allowing rollback in-case of an error. Updates to the application 230 can be put live in production using the development interface 216 without disrupting operations.

As described herein, an embodiment of the development interface 216 enables a software application 230 to be defined without requiring traditional programming. Furthermore, the development interface 216 can be utilized alongside the end user interface 218 by programmers and/or non-technical personnel (e.g., developer(s)) to implement dynamic changes to the application 230, while the application 230 is deployed and being utilized by other users 14 within an entity. To this extent, the development interface 216 can enable the development and maintenance of adaptive business applications 230 by making it easier for all users 14 in an entity to collaborate across distributed and diverse systems, including the application development and maintenance process.

FIGS. 9A-9I show illustrative graphical user interfaces, which can be part of a development interface described herein, according to embodiments. To this extent, each of the interfaces can be generated by an application 230 (FIG. 2) for presentation to a user 14 (FIG. 2). It is understood that while graphical user interfaces are shown as illustrative interfaces, the application 230 can manage any type of interface that enables a human or system user to manage the resources of an application 230. The interfaces are described in conjunction with FIG. 2 as an illustrative environment.

Figure 9A:

In FIG. 9A, the interface provides an inventory of links to application resources for presentation to a user 14. Each entry (row) in the table can correspond to an resource 224, 228 of an application 230. As illustrated, the interface can provide various attributes corresponding to each resource 224, 228 to the user 14, including for example, a corresponding identifier, a name, a type, a status, and application (activity). Additionally, the interface can: enable the user 14 to find a specific set of resources 224, 228; filter the resources 224, 228 provided by subject and/or one or more of the attributes (e.g., by selecting the 'F' interface control next to each attribute); sort the resources 224, 228 by an attribute (e.g., by selecting the attribute heading); and/or the like.

Figure 9B:
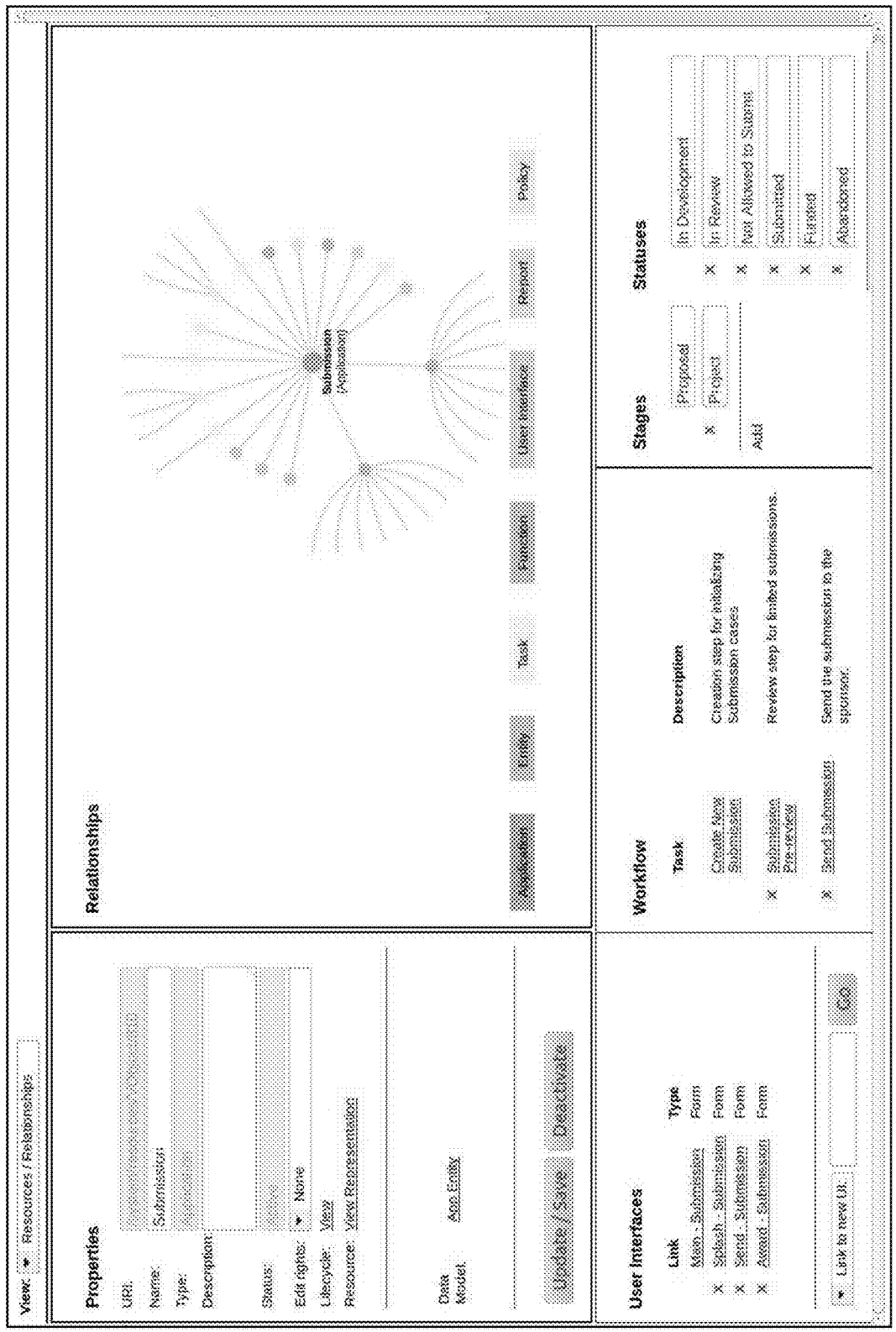

In FIG. 9B, the interface provides an ability for a user 14 to view and/or modify one or more aspects of a model defining an application (activity) performed by the application 230. As illustrated, the interface can display: various properties of the activity; a relationship graph for implementing the activity; user interface(s) used in the activity; workflow(s) used in the activity; stages and statuses corresponding to the activity; and/or the like. The relationship graph can distinguish the various types of resources 224, 228 used to implement the activity. For example, the types of resources 224, 228 can include: an application (activity); an entity; a task; a function; a user interface; a report; a policy; and/or the like. Using the interface, a user 14 can select a resource 224, 228 (e.g., in the relationship graph) and view/modify details corresponding to the resource 224, 228.

Figure 9C:
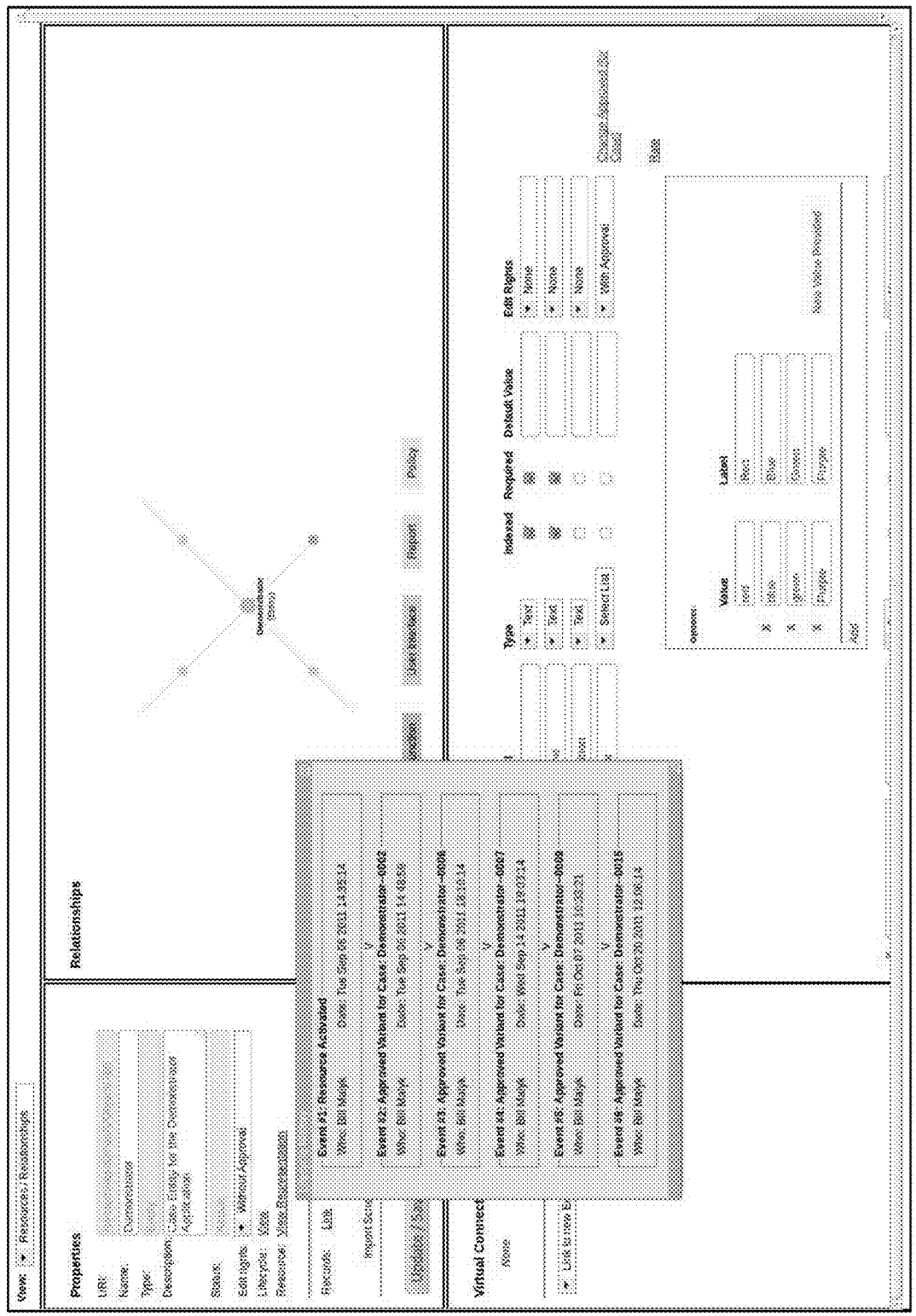

In FIG. 9C, the interface enables a user 14 to obtain additional information corresponding to a resource 224, 228 being viewed. For example, the interface is shown displaying information corresponding to a resource 224, 228 named "Demonstrator." The user 14 can view various information corresponding to a full lifecycle of changes made to the resource 224, 228, e.g., by clicking on the view link for the lifecycle and being presented with the popup window shown. The lifecycle history can include information corresponding to the change, such as for example, a user responsible for the change, a description of the change, a date/timestamp for the change, and/or the like.

Figure 9D:
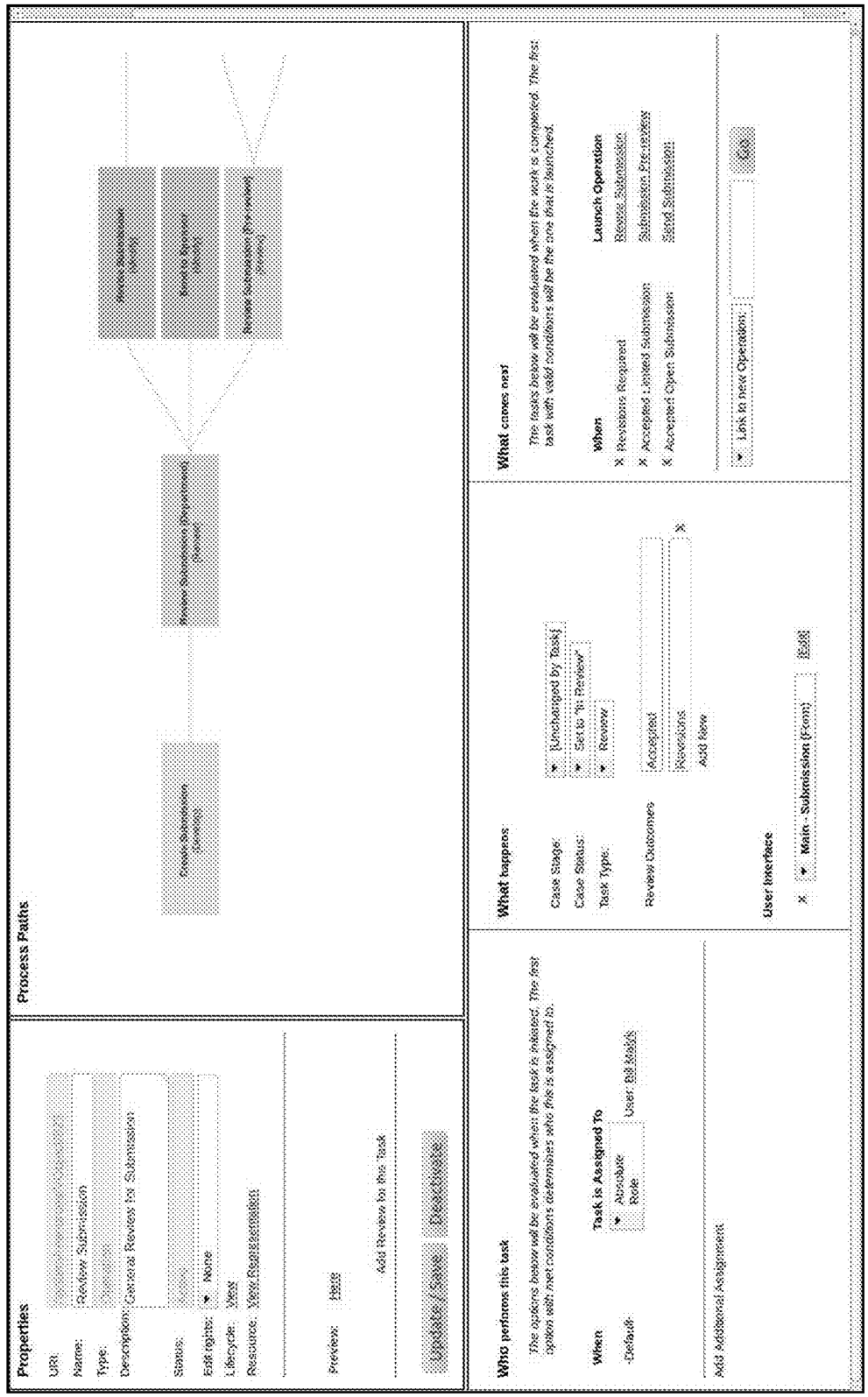

In FIG. 9D, the interface provides information of a model resource corresponding to a task resource 224, 228 (named "Review Submission" in this case) for presentation to a user 14. The user 14 can use the interface to modify one or more attributes of the task resource 224, 228. As illustrated, the interface can include a process path screen, which displays a simulation of the pre- (e.g., how the task is initiated) and post- (e.g., the possible tasks following the current task) conditions for the corresponding task. A user 14 can use the interface to modify one or more attributes of the task, such as add/remove a next task, the conditions for the next task, and/or the like.

In FIG. 9E, the interface provides a decision table, which enables a user 14 to define one or more parameters and/or triggers used to determine a next task at the conclusion of a task. In this case, three functions are evaluated and summed using a scaling factor to calculate the corresponding result. Using the interface, a user 14 can add additional function(s), remove a function, adjust the scaling factor for a function, and/or the like.

Figure 9F:
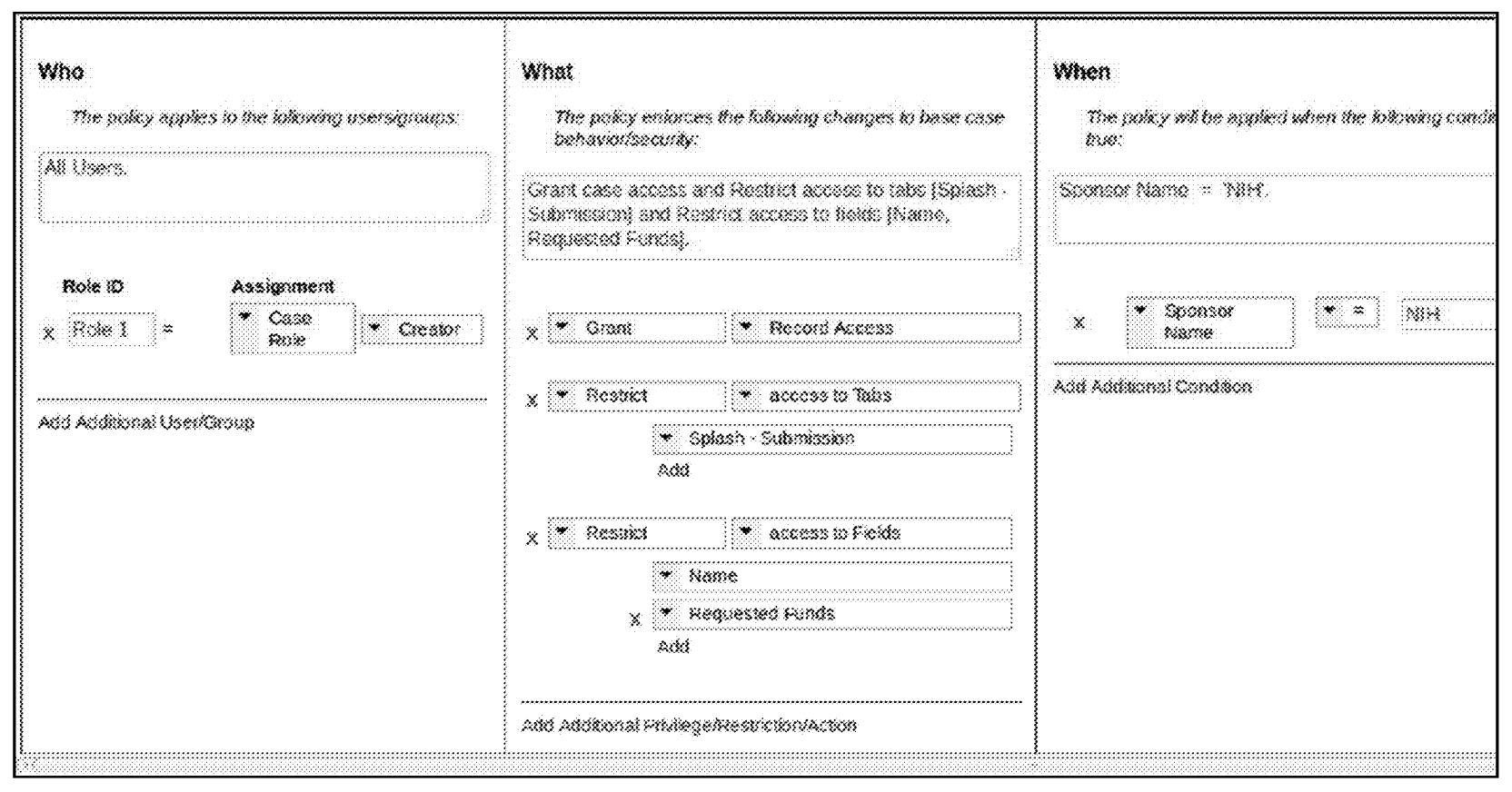

In FIG. 9F, the interface enables a user 14 to create/view/modify a rule (policy) resource 224, 228 of an application. Attributes of the rule can include: the user(s) to which the rule applies; privileges, restrictions, actions, and/or the like, the rule enforces; a set of conditions triggering the rule; and/or the like.

Figure 9G:
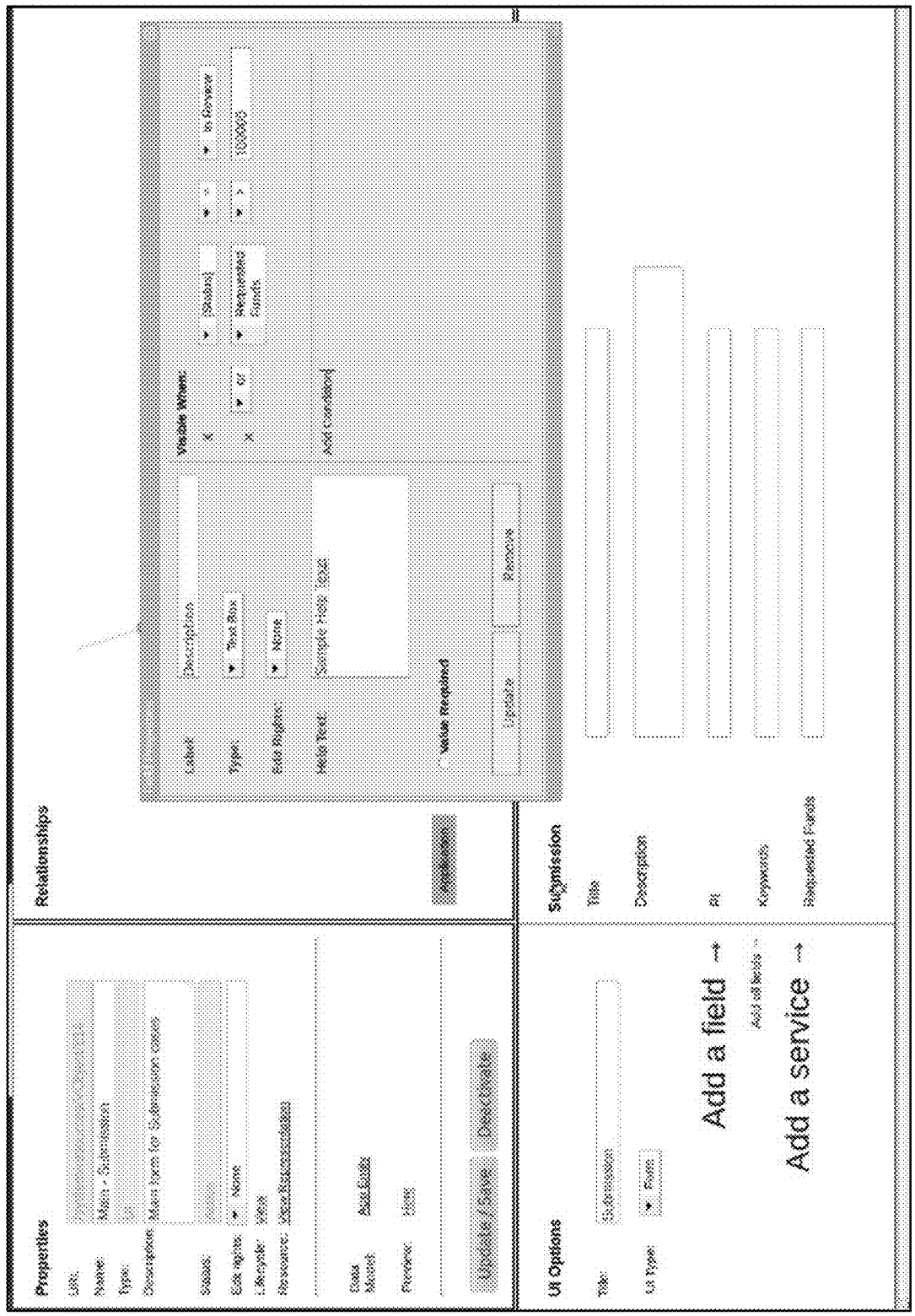

In FIG. 9G, the interface enables a user 14 to create/view/modify a user interface resource 224, 228. As illustrated, the user 14 can: add a field to the user interface; change one or more attributes of the user interface; and/or the like. Furthermore, for each field of the user interface, the interface can enable the user 14 to obtain additional information and/or modify one or more aspects of the field as shown in the popup interface.

Figure 9H:
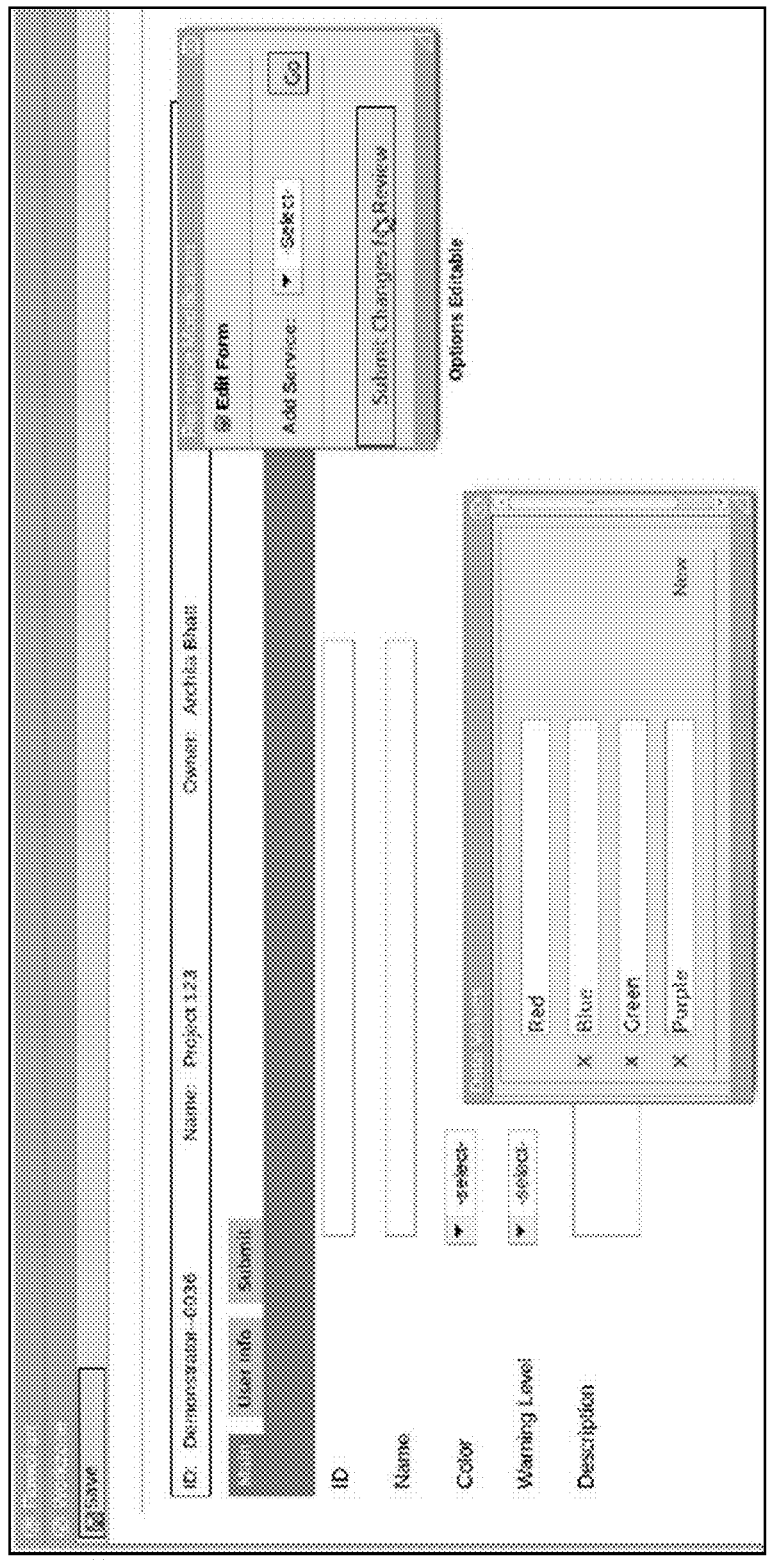

In FIG. 9H, the interface illustrates a user 14 requesting a modification to an resource 224, 228 while using the application 230 to perform an activity. As illustrated, the user 14 is requesting that an additional valid data value be added for an attribute. Once the request is complete, the user 14 can submit the change for review by another user 14 (e.g., a developer). In this manner, the application 230 can enable real time collaboration between the different types of users 14.

Figure 9I:
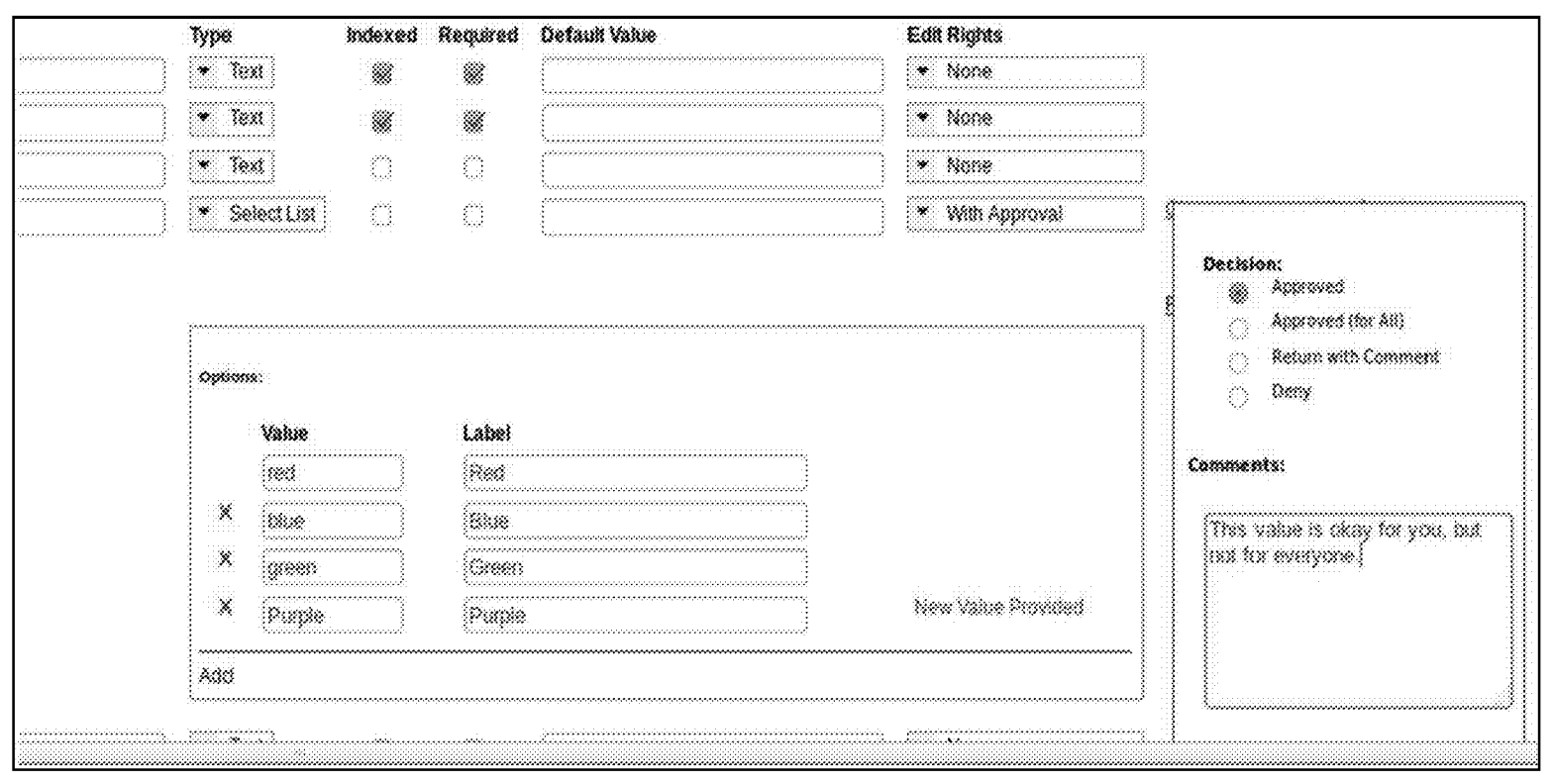

In FIG. 9I, the interface illustrates a user 14 (e.g., a developer) providing a decision to the requested modification shown in FIG. 9H. As illustrated, the user 14 can approve, deny, or request additional information regarding the change. When approved, the user 14 can approve the change along with a scope of the change, e.g., for all users or a subset of the users (e.g., only the requesting user 14, a subset of users similar to the requesting user 14, and/or the like).

As described herein, a system for managing a software application can be implemented, in which the previous distinction between development and runtime is eliminated. To this extent, aspects of the invention can provide one or more of:

a) a modeling environment, which is an application of the system, e.g., an instantiation of the system;

b) modeling within the modeling environment application is an execution of the system;

c) no separation between "design-time" and "run-time", the system can be fully dynamic—there is just "interaction-time", which is an instantiation of the system;

d) the modeling environment application can be an application for creating and/or modifying other applications and other application resources;

e) the modeling environment application can be configured for use by a non-technical business analyst, or other user, to declaratively design new and/or modify existing models (meta-resources);

f) models can include, but are not limited to: business entities (including people); business policies; applications; capabilities; automated scripts/business processes; tasks; adaptors for third party services; APIs; databases; systems; devices; etc.

g) the modeling environment application can generate system validated and well-formed resources, e.g., a discrete meta-resource representing the "model" the user chose to create or modify (the system can support the principle of "immutability" such that 'modify' also results in a new meta-resource) and a set of atomic and/or other meta-resources that support the model;

h) in the modeling environment application, the user can associate other atomic and/or other meta-resources using links and metadata references, and/or adding other new atomic and/or other meta-resources;

i) the system can operate ('run') without the modeling environment application, it is an alternative to hand-writing resources and manually connecting them with links and metadata references, likewise the modeling environment application can benefit from all properties of the system design (e.g., contextual, extensible, configurable, adaptable, etc.) and can avail itself of all system properties (embodied in other atomic and meta-resources);

j) the system can be fully dynamic and based on stateless, immutable, loosely-coupled resources (atomic and meta), in which case all models (themselves resources) are handled by representations (as with REST-style architecture) and bound late in real time by the system (separating the model from its implementation);

k) in response to an interaction request, the system can interpret representations (resources handled by representation as in REST-style architecture) of models, follow links, resolve metadata references (including complex and probabilistic queries—real-time business Intelligence and predictive analytics within the transaction micro-flow);

l) the late-binding of representations of models supports the separation of the model from implementation, the declarative link and metadata references of the model can be 'substituted' for values/resources (atomic or meta-resources) at run-time for the specific implementation, such customization can be referred to as local variance of an instance of a model (including user-driven modification and automated "personalization").

m) separation of the model from implementation supports run-time customization of all interactions, including 'concerns' at all levels of the system (application logic; enterprise governance policies; system controls; and/or the like), wherein the 'concerns' are represented by other models that also bind at run-time so they are specific to the interaction;

n) separation of the model from implementation can support run-time adaptability of all models as the 'designer' of a model can delegate configuration and extension of the model to a user of the model at run-time for either 1) their individual interaction; 2) to change or request a change to the overall model—in this case discrete models (e.g., tools/capabilities) of the modeling environment application can be made available to that user for that purpose; and o) the late-binding of representations of models supports the separation of the model from implementation, the declarative link and metadata references of the model can be 'substituted' for values/resources (atomic or meta-resources) at run-time for the specific implementation, such customization can be referred to as global change of a model (including user-driven modification and automated "machine learning").

While shown and described herein as an application meta-model and system for self-modification, it is understood that aspects of the invention further provide various alternative embodiments. For example, in one embodiment, the invention provides a computer program fixed in at least one computer-readable storage medium, which when executed, enables a computer system to provide dynamic design, use, and modification of models using a declarative application meta-model that provides for self-modification of a collection of the models as described herein. To this extent, the computer-readable medium includes program code, such as the application 112 (FIG. 1) and/or the application 130 (FIG. 1), which enables a computer system to implement some or all of a process described herein. It is understood that the term "computer-readable storage medium" comprises one or more of any type of tangible medium of expression, now known or later developed, from which a copy of the program code can be perceived, reproduced, or otherwise communicated by a computing device. For example, the computer-readable storage medium can comprise: one or more portable storage articles of manufacture; one or more memory/storage components of a computing device; and/or the like.

In another embodiment, the invention provides a method of providing a copy of program code, such as the application 112 (FIG. 1) and/or the application 130 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for providing dynamic design, use, and modification of models using a declarative application meta-model that provides for self-modification of a collection of the models as described herein. In this case, the generating can include configuring a computer system, such as the computer system 152 (FIG. 1), to implement a process described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A computer system comprising:
a processing component; and
a storage component, wherein the storage component includes at least one non-transitory computer-readable medium storing a software application, wherein the software application, when executed by the processing component, enables the computer system to implement an environment for managing models using a declarative application meta-model that provides for self-modification of a collection of the models, wherein the managing includes:
processing interactions with one or more models in the collection of models by one or more users in a runtime environment, wherein the processing includes, in response to an interaction request, binding the one or more models in the collection of models in real-time to dynamically construct an implementation of the one or more models in the collection of models,
wherein the collection of models includes at least one set of related models, and wherein each model in a set of related models can configure at least one property of a set of properties of the set of related models so that collective properties of the set of related models emerge dynamically from interaction of the set of related models.

2. The system of claim 1, wherein the managing enables continuous real-time testing, simulation, deployment, and modification of the collection of models.

3. The system of claim 1, wherein the binding comprises late-binding of an application associated with the collection of models enabling the one or more users to perform at least one interaction using the environment without disrupting the application.

4. The system of claim 1, wherein the software application includes an intermediary component, wherein the intermediary component:
receives each interaction request;
processes at least one model in the collection of models in response to each interaction request; and
provides at least one implementation of the at least one model for use by a requesting user in response to each interaction request.

5. The system of claim 4, wherein the intermediary component includes:
a construction service resource configured to generate the at least one implementation of the at least one model; and
a system controller, wherein the system controller receives each interaction request, causes a representation of the construction service resource to process the interaction request, and provides the at least one implementation of the at least one model for use by the requesting user.

6. The system of claim 4, wherein the intermediary component manages a plurality of distinct collections of models using the declarative application meta-model.

7. The system of claim 6, wherein at least one of the plurality of distinct collections of models defines logic for at least one of a process and a software application.

8. The system of claim 7, wherein the managing includes executing an instance of the at least one of the process and the software application, and wherein the requesting user can modify a configuration of the at least one of the process and the software application during the executing.

9. The system of claim 1, wherein a set of models of modification controls enables a requesting user to modify at least one of a configuration of a model for the requesting user and a configuration of the model for use in all subsequent instances of the model.

10. The system of claim 9, wherein a configuration of the set of models of modification controls is modifiable.

11. The system of claim 1, wherein a set of restrictions on configuration of at least one model in the collection of the models is configured using at least one model in a set of models in the collection of models.

12. A non-transitory computer readable medium comprising instructions which when executed, enables a computer system to implement a method of managing models using a declarative application meta-model that provides for self-modification of a collection of the models, wherein the method includes:
receiving requests for design, use, and modification interactions with the collection of models from users in a runtime environment; and
processing interactions with one or more models in the collection of models by one or more of the users in the runtime environment, wherein the processing includes, in response to an interaction request, binding the one or more models in the collection of models in real-time to dynamically construct an implementation of the one or more models in the collection of models,
wherein the collection of models includes at least one set of related models, and wherein each model in a set of related models can configure at least one property of a set of properties of the set of related models so that collective properties of the set of related models emerge dynamically from interaction of the set of related models.

13. The non-transitory computer readable medium of claim 12, wherein the managing enables continuous real-time testing, simulation, deployment, and modification of the collection of models.

14. The non-transitory computer readable medium of claim 12, wherein the program product includes an intermediary component, wherein the intermediary component:
receives each interaction request;
processes at least one model in the collection of models in response to each interaction request; and provides at least one implementation of the at least one model for use by a requesting user in response to each interaction request.

15. The non-transitory computer readable medium of claim 14, wherein the intermediary component includes:
   a construction service resource configured to generate the at least one implementation of the at least one model; and
   a system controller, wherein the system controller receives each interaction request, causes a representation of the construction service resource to process the interaction request, and provides the at least one implementation of the at least one model for use by the requesting user.

16. The non-transitory computer readable medium of claim 14, wherein the intermediary component manages a plurality of distinct collections of models using the declarative application meta-model.

17. The non-transitory computer readable medium of claim 16, wherein at least one of the plurality of distinct collections of models defines logic for at least one of a process and a software application.

18. The non-transitory computer readable medium of claim 17, wherein the managing includes executing an instance of the at least one of the process and the software application, and wherein the requesting user can modify a configuration of the at least one of the process and the software application during the executing.

19. A computerized method of managing models using a declarative application meta-model that provides for self-modification of a collection of the models, wherein the method includes:
   receiving, by a computer system, requests for interaction with one or more models in the collection of models from users in a runtime environment; and
   processing, by the computer system, interactions with one or more models in the collection of models, wherein the processing includes, in response to an interaction request, binding the one or more models in the collection of models in real-time to dynamically construct an implementation of the one or more models in the collection of models,
   wherein the collection of models includes at least one set of related models, and wherein each model in a set of related models can configure at least one property of a set of properties of the set of related models so that collective properties of the set of related models emerge dynamically from interaction of the set of related models.

20. The method of claim 19, wherein the collection of models defines logic for at least one of a process and a software application.

* * * * *